US012557137B2

(12) United States Patent
Hirzallah et al.

(10) Patent No.: US 12,557,137 B2
(45) Date of Patent: Feb. 17, 2026

(54) CHANNEL OCCUPANCY SHARING CONDITIONS FOR BEAM-BASED CHANNEL ACCESS

(71) Applicant: QUALCOMM Incorporated, San Diego, CA (US)

(72) Inventors: Mohammed Ali Mohammed Hirzallah, San Diego, CA (US); Xiaoxia Zhang, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 748 days.

(21) Appl. No.: 17/878,752

(22) Filed: Aug. 1, 2022

(65) Prior Publication Data

US 2024/0040616 A1 Feb. 1, 2024

(51) Int. Cl.
*H04W 74/0808* (2024.01)

(52) U.S. Cl.
CPC ............ *H04W 74/0808* (2013.01)

(58) Field of Classification Search
CPC .................................. H04W 74/0808
See application file for complete search history.

(56) References Cited

U.S. PATENT DOCUMENTS

| | | | | |
|---|---|---|---|---|
| 9,178,583 B2* | 11/2015 | Nam | ......... | H04L 5/0023 |
| 10,582,413 B2* | 3/2020 | Babaei | ......... | H04W 72/21 |
| 10,912,128 B2* | 2/2021 | Li | ......... | H04W 88/08 |
| 11,044,739 B2* | 6/2021 | Li | ......... | H04L 27/26136 |
| 11,071,086 B2* | 7/2021 | Park | ......... | H04W 76/28 |
| 11,337,120 B2* | 5/2022 | Hampel | ......... | H04W 36/302 |
| 11,381,981 B2* | 7/2022 | Yerramalli | ......... | H04B 7/0617 |
| 11,497,056 B2 | 11/2022 | Goyal et al. | | |
| 11,652,590 B2* | 5/2023 | Park | ......... | H04B 7/024 370/329 |
| 11,689,883 B2* | 6/2023 | Alawieh | ......... | G01S 5/06 370/329 |

(Continued)

FOREIGN PATENT DOCUMENTS

WO WO-2021034628 A1 2/2021

OTHER PUBLICATIONS

International Search Report and Written Opinion—PCT/US2023/028486—ISA/EPO—Nov. 2, 2023.

*Primary Examiner* — Kevin T Bates
(74) *Attorney, Agent, or Firm* — Holland & Hart LLP

(57) ABSTRACT

This disclosure provides systems, methods and apparatus, including computer programs encoded on computer storage media, for channel occupancy sharing conditions for beam-based channel access. In some aspects, one or more wireless devices may support a beam-based channel access procedure according to which a first wireless device may share a channel occupancy time (COT) of a second wireless device without performing a listen-before-talk (LBT) procedure if one or more conditions associated with a transmission from the first wireless device are satisfied. Such conditions may be associated with whether a directional beam used by the first wireless device satisfies a narrow beam condition, a time gap between a transmission from the second wireless device and a transmission from the first wireless device, or a duration of a continuous transmission from the first wireless device, or any combination thereof.

16 Claims, 9 Drawing Sheets

(56) References Cited

U.S. PATENT DOCUMENTS

| | | | |
|---|---|---|---|
| 2020/0252806 A1 | 8/2020 | Yerramalli et al. | |
| 2020/0267736 A1* | 8/2020 | Hafeez | H04B 7/0695 |
| 2021/0251002 A1* | 8/2021 | Sun | H04W 16/14 |
| 2022/0210827 A1* | 6/2022 | Wang | H04W 16/14 |
| 2023/0093200 A1* | 3/2023 | Myung | H04B 7/0695 |
| | | | 375/267 |
| 2023/0104623 A1* | 4/2023 | Hirzallah | H04W 72/046 |
| | | | 370/329 |
| 2023/0126765 A1* | 4/2023 | Yang | H04B 7/0408 |
| | | | 370/328 |
| 2023/0189382 A1* | 6/2023 | Haustein | H04W 76/20 |
| | | | 370/329 |
| 2023/0362968 A1* | 11/2023 | Xi | H04W 72/53 |
| 2024/0121714 A1* | 4/2024 | Kwon | H04W 72/23 |
| 2024/0163867 A1* | 5/2024 | Bagheri | H04W 72/1263 |

* cited by examiner

CHANNEL OCCUPANCY SHARING CONDITIONS FOR BEAM-BASED CHANNEL ACCESS

TECHNICAL FIELD

This disclosure relates to wireless communications, including channel occupancy sharing conditions for beam-based channel access.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a first device. The method may include receiving a first message using a shared wireless channel and during a channel occupancy time (COT) associated with communication between the first device and a second device and transmitting, via a directional beam, a second message using the shared wireless channel and during the COT associated with the communication between the first device and the second device, where one or both of a time gap between the first message and the second message or an upper limit transmission duration of the second message is associated with a width of the directional beam.

Another innovative aspect of the subject matter described in this disclosure can be implemented in an apparatus for wireless communications at a first device. The apparatus may include one or more interfaces and a processing system. The one or more interfaces may be configured to obtain a first message using a shared wireless channel and during a COT associated with communication between the first device and a second device and output, via a directional beam, a second message using the shared wireless channel and during the COT associated with the communication between the first device and the second device, where one or both of a time gap between the first message and the second message or an upper limit transmission duration of the second message is associated with a width of the directional beam.

Another innovative aspect of the subject matter described in this disclosure can be implemented in an apparatus for wireless communications at a first device. The apparatus may include a processor, memory coupled with the processor, and instructions stored in the memory. The instructions may be executable by the processor to cause the apparatus to receive a first message using a shared wireless channel and during a COT associated with communication between the first device and a second device and transmit, via a directional beam, a second message using the shared wireless channel and during the COT associated with the communication between the first device and the second device, where one or both of a time gap between the first message and the second message or an upper limit transmission duration of the second message is associated with a width of the directional beam.

Another innovative aspect of the subject matter described in this disclosure can be implemented in another apparatus for wireless communications at a first device. The apparatus may include means for receiving a first message using a shared wireless channel and during a COT associated with communication between the first device and a second device and means for transmitting, via a directional beam, a second message using the shared wireless channel and during the COT associated with the communication between the first device and the second device, where one or both of a time gap between the first message and the second message or an upper limit transmission duration of the second message is associated with a width of the directional beam.

Another innovative aspect of the subject matter described in this disclosure can be implemented in a non-transitory computer-readable medium storing code for wireless communications at a first device. The code may include instructions executable by a processor to receive a first message using a shared wireless channel and during a COT associated with communication between the first device and a second device and transmit, via a directional beam, a second message using the shared wireless channel and during the COT associated with the communication between the first device and the second device, where one or both of a time gap between the first message and the second message or an upper limit transmission duration of the second message is associated with a width of the directional beam.

Some implementations of the method, apparatuses, and non-transitory computer-readable medium described herein may further include operations, features, means, or instructions for receiving, from the second device, an indication of one or both of the time gap or the upper limit transmission duration of the second message, where both the time gap and the upper limit transmission duration of the second message may be associated with the width of the directional beam.

Another innovative aspect of the subject matter described in this disclosure can be implemented in a method for wireless communications. The method may include transmitting, to a first device from a second device, a first message using a shared wireless channel and during a COT associated with communication between the first device and the second device and receiving, from the first device via a directional beam, a second message using the shared wireless channel and during the COT associated with the communication between the first device and the second device, where one or both of a time gap between the first message and the second message or an upper limit transmission duration of the second message is associated with a width of the directional beam.

Another innovative aspect of the subject matter described in this disclosure can be implemented in an apparatus for wireless communications. The apparatus may include one or more interfaces and a processing system. The one or more interfaces may be configured to output, to a first device from a second device, a first message using a shared wireless channel and during a COT associated with communication between the first device and the second device and obtain, from the first device via a directional beam, a second message using the shared wireless channel and during the COT associated with the communication between the first device and the second device, where one or both of a time gap between the first message and the second message or an upper limit transmission duration of the second message is associated with a width of the directional beam.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to transmit, to a first device from a second device, a first message using a shared wireless channel and during a COT associated with communication between the first device and the second device and receive, from the first device via a directional beam, a second message using the shared wireless channel and during the COT associated with the communication between the first device and the second device, where one or both of a time gap between the first message and the second message or an upper limit transmission duration of the second message is associated with a width of the directional beam.

Another innovative aspect of the subject matter described in this disclosure can be implemented in another apparatus for wireless communications. The apparatus may include means for transmitting, to a first device from a second device, a first message using a shared wireless channel and during a COT associated with communication between the first device and the second device and means for receiving, from the first device via a directional beam, a second message using the shared wireless channel and during the COT associated with the communication between the first device and the second device, where one or both of a time gap between the first message and the second message or an upper limit transmission duration of the second message is associated with a width of the directional beam.

Another innovative aspect of the subject matter described in this disclosure can be implemented in a non-transitory computer-readable medium storing code for wireless communications. The code may include instructions executable by a processor to transmit, to a first device from a second device, a first message using a shared wireless channel and during a COT associated with communication between the first device and the second device and receive, from the first device via a directional beam, a second message using the shared wireless channel and during the COT associated with the communication between the first device and the second device, where one or both of a time gap between the first message and the second message or an upper limit transmission duration of the second message is associated with a width of the directional beam.

Some implementations of the method, apparatuses, and non-transitory computer-readable medium described herein may further include operations, features, means, or instructions for transmitting, to the first device, an indication of one or both of the time gap or the upper limit transmission duration of the second message, where both the time gap and the upper limit transmission duration of the second message may be associated with the width of the directional beam.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
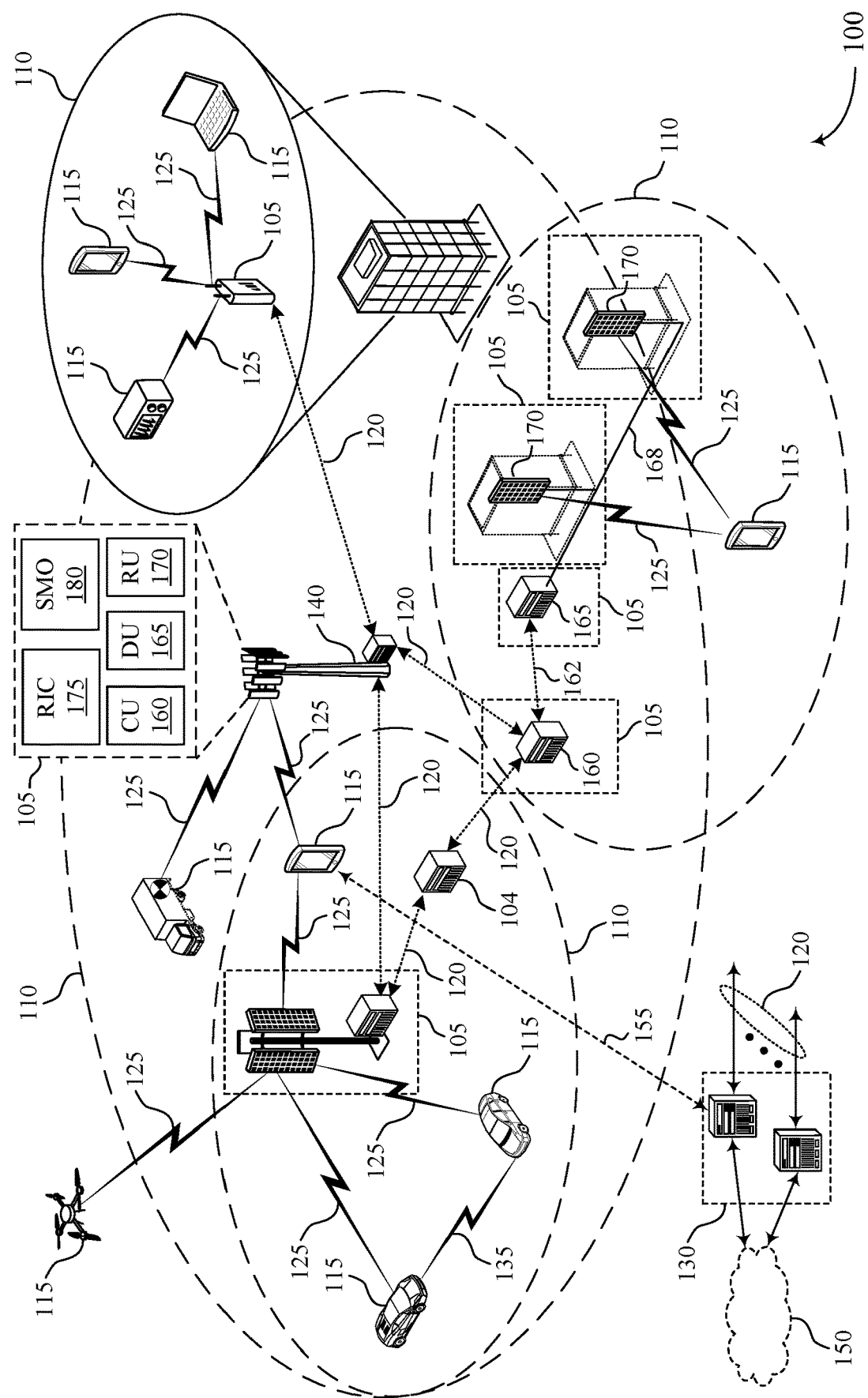
FIG. 1 shows an example wireless communications system that supports channel occupancy sharing conditions for beam-based channel access.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G) or fifth generation (5G), or further implementations thereof, technology.

In some wireless communications systems, wireless devices may communicate using an unlicensed radio frequency band and also may employ one or more collision avoidance mechanisms to avoid or mitigate interference between different transmissions. For example, a wireless device may perform a listen-before-talk (LBT) or a long-term (LT) sensing procedure to measure whether any other nearby wireless devices are transmitting and may initiate and transmit during a channel occupancy time (COT) if the wireless device measures that a channel is available. In some operating scenarios, a wireless device may refrain from performing an LBT or LT sensing procedure to access a channel. For example, the wireless device may support a coexistence technique, such as a beam-based coexistence technique according to which the wireless device may access a channel without performing an LBT procedure if the wireless device satisfies a narrow beam condition. While some types of wireless devices (such as network entities) may use directional beams that satisfy a narrow beam condition relatively often, some other types of wireless devices (such as user equipment (UEs)) may use relatively wider directional beams that often fail a narrow beam condition. As such, some types of wireless devices may frequently be constrained to performing an LBT or LT sensing procedure prior to a transmission, which may be limiting for some service types (such as ultra-reliable low latency communication (URLLC) service types).

In some implementations, one or more wireless devices may support a beam-based channel access procedure according to which a first wireless device may share a COT of a second wireless device without performing an LBT or LT sensing procedure in accordance with one or more conditions associated with a transmission from the first wireless device. Such conditions may be associated with whether a directional beam used by the first wireless device satisfies a narrow beam condition, a time gap between a transmission from the second wireless device and a transmission from the first wireless device, or a duration of a continuous transmission from the first wireless device, or any combination thereof. In some implementations, the time gap or the transmission duration may be restricted (such as may be associated with a finite upper limit or maximum value) or may be unrestricted (such as may be any value) in accordance with whether the directional beam used by the first wireless device satisfies a narrow beam condition or in accordance with various system deployments, or both. For example, if the directional beam used by the first wireless device fails to satisfy a narrow beam condition, the first wireless device may still transmit during the COT of the second wireless device if the first wireless device uses a threshold time gap between transmissions or if the transmission to be performed by the first wireless device is less than a threshold time duration, or both.

Particular implementations of the subject matter described in this disclosure can be implemented to realize one or more of the following potential advantages. For example, as a result of enabling the first wireless device to transmit during the COT of the second wireless device if the first wireless device fails to satisfy a narrow beam condition but satisfies one or more other conditions, the first wireless device may achieve lower latency and greater data rates without causing a significant interference contribution to other signaling in the system. As such, the first wireless device may support one or more latency-critical service types, such as a URLLC service type. Further, in accordance with such a COT sharing procedure that leverages narrow beam conditions and timing aspects associated with a given transmission, wireless devices may experience greater medium access (such as a greater likelihood of obtaining channel access) and greater coexistence, which may further support higher data rates, greater system capacity, and greater spectral efficiency, among other benefits. Additionally, the first wireless device may achieve reduced circuit complexity, lower power consumption, and greater battery life in accordance with enabling the first wireless device to share a COT of the second wireless device without performing an LBT or LT sensing procedure. For example, as a result of enabling the first wireless device to share a COT of the second wireless device without performing an LBT or LT sensing procedure, the first wireless device may reduce an amount of power used for and a circuit complexity associated with conducting LBT or LT sensing procedures.

FIG. 1 shows an example wireless communications system 100 that supports channel occupancy sharing conditions for beam-based channel access. The wireless communications system 100 may include one or more network entities 105, one or more UEs 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as a radio frequency (RF) access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, stand-alone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof. An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending on which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support channel occupancy sharing conditions for beam-based channel access as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

Signal waveforms transmitted via a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, in some implementations, refer to a sampling period of $TS=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHz.

The wireless communications system 100 also may operate using a super high frequency (SHF) region, which may be in the range of 3 GHz to 30 GHz, also known as the centimeter band, or using an extremely high frequency (EHF) region of the spectrum (such as from 30 GHz to 300 GHz), also known as the millimeter band. In some implementations, the wireless communications system 100 may support millimeter wave (mmW) communications between the UEs 115 and the network entities 105 (such as BSs 140, RUs 170), and EHF antennas of the respective devices may be smaller and more closely spaced than UHF antennas. In some implementations, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be based on a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

In some wireless communications systems, such as the wireless communications system 100, wireless devices (such as one or more UEs 115 or one or more network entities 105, or any combination thereof) may communicate using an unlicensed radio frequency band, which may be equivalently referred to as an unlicensed spectrum band. For example some wireless devices may communicate using mmW or sub-terahertz (THz) frequencies, which may offer an abundance of (such as a relatively large quantity of) unlicensed spectrum bands that wireless devices may use for transmitting or receiving signaling. In some aspect, wireless devices may perform transmission and reception via such unlicensed spectrum bands using directional communication (such as using configurations for directional communication, such as directional communication beams).

Directional communication may result in or otherwise support an interference-limited wireless environment due to the focused nature of beamformed transmissions. In some operating scenarios, and in accordance with potentially limiting interference via beamforming, a wireless device may refrain from performing an LBT or LT sensing procedure. In other words, some systems may generally specify that each wireless device in the system is to perform an LBT or LT sensing procedure prior to transmitting, but may allow or enable some wireless devices to transmit without any requirement to perform an LBT or LT sensing procedure prior to the transmission if such wireless devices use a directional beam that satisfies one or more conditions. For example, to resolve or avoid potential beam collisions (such as collisions or interference between two or more wireless, beamformed transmissions) in an unlicensed spectrum band, LBT and LT sensing procedures may be combined with a beam-based coexistence technique to enable selective or conditional use of an LBT or LT sensing procedure if one or more conditions associated with the coexistence technique are satisfied.

A coexistence technique may take various forms, each of which may be associated with a manner according to which one or more wireless devices avoid or mitigate interfering with other transmissions in a system. In some aspects, a coexistence technique may be associated with a narrow beam condition, which may enable a wireless device to access and transmit using a channel without performing an LBT or LT sensing procedure depending on a narrowness (such as a focus, sharpness, accuracy, or lobe angle, size, or strength) of a directional beam used for a transmission. Further, a "narrowness" of a beam may relate to any features or characteristics of a beam that impact a level of interference associated with (such as caused by) the beam, and thus "narrowness" may not be limited or constrained as only referring to a geometrical shape of the beam.

In accordance with a narrow beam condition-based coexistence technique, a wireless device may access a channel without performing an LBT or LT sensing procedure if the wireless device satisfies a narrow beam condition. In some aspects, however, some types of wireless devices (such as UEs 115) may frequently fail to satisfy a narrow beam condition and may therefore be constrained to perform an LBT or LT sensing procedure prior to each transmission, which may be expensive in terms of latency and power consumption. Accordingly, in some implementations, one or more wireless devices may support one or more conditions for sharing a COT of another wireless device for narrow beam-based channel access, where a strictness or flexibility of such conditions may depend on whether a wireless device satisfies a narrow beam condition.

The one or more conditions may include one or both of a time gap between two consecutive transmissions or an upper limit transmission duration of a transmission from the wireless device attempting to share the COT of the other wireless device. For example, a first wireless device (such as a UE 115) may receive a first message from a second wireless device (such as a network entity 105) during a COT of the second wireless device and the first wireless device may transmit a second message during the COT of the second wireless device (and without performing an LBT or LT sensing procedure) if a time duration between the first message and the second message satisfies the time gap and if a transmission duration of the second message satisfies the upper limit transmission duration. A respective value of one or both of the time gap or the upper limit transmission duration may be associated with a width of a directional beam used by the first wireless device (such as whether the directional beam satisfies a narrow beam condition). The example implementations described herein may apply to COT sharing between downlink and uplink communications, or between sidelink communications, or any combination thereof.

Figure 2:
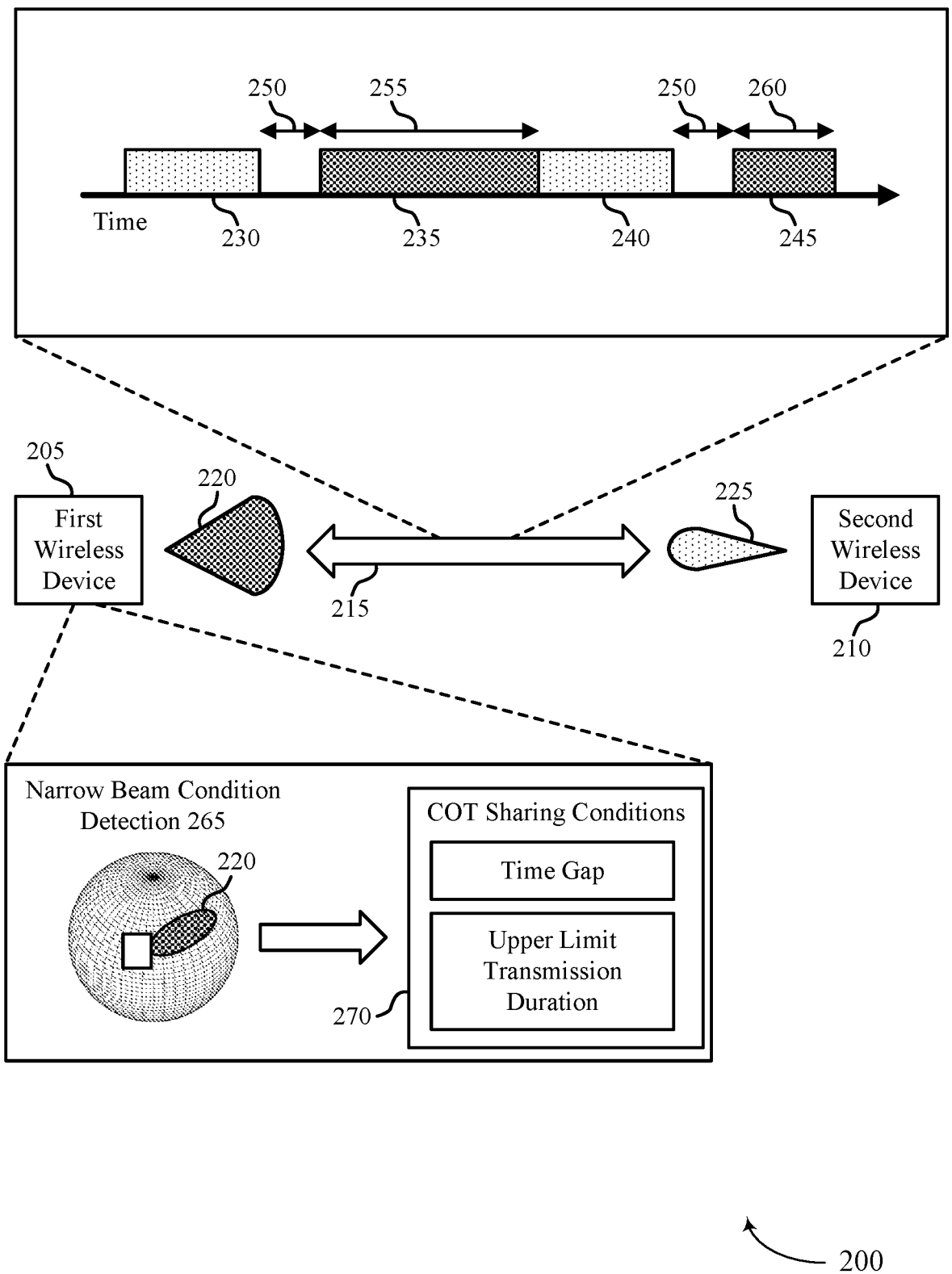
FIG. 2 shows an example signaling diagram that supports channel occupancy sharing conditions for beam-based channel access.

FIG. 2 shows an example signaling diagram 200 that supports channel occupancy sharing conditions for beam-based channel access. The signaling diagram 200 may implement or be implemented to realize aspects of the wireless communications system 100. For example, the signaling diagram 200 illustrates communication between a first wireless device 205 and a second wireless device 210 via a communication link 215 (which may be an example of a communication link associated with an unlicensed radio frequency or spectrum band). The first wireless device 205 and the second wireless device 210 each may be an example of a UE 115 or a network entity 105 as illustrated by and described with reference to FIG. 1. The first wireless device 205 may communicate (such as transmit or receive, or both) using a directional beam 220 and the second wireless device 210 may communicate (such as transmit or receive, or both) using a directional beam 225 and, in some implementations, the first wireless device 205 may share a COT of the second wireless device 210 in accordance with one or more conditions and depending on whether a width of the directional beam 220 satisfies a narrow beam condition.

In some systems, LBT, LT sensing, and narrow beam channel access modes may be key elements to support overall system performance and avoid or mitigate an amount of interference experienced by various devices within a system. For example, wireless devices may support LBT, LT sensing, and narrow beam channel access modes for unlicensed or shared bands, such as for mmW unlicensed or shared bands (such as for 60 GHz channel access). Further, various wireless devices may support one or more operating modes, which may be associated with a frequency band used for communication.

For example, operating modes for a frequency band (such as a 60 GHz band) may include three different operating modes that a wireless device may use if communicating using that frequency band. A first operating mode (which may be referred to as "C1") may be applicable to mobile or fixed wireless devices and may specify that LBT is to be performed at an initiating device (such as a wireless device initiating a transmission). A second operating mode (which may be referred to as "C2") may be applicable to mobile or fixed devices and may specify how LBT may be skipped at either a transmit side or a receive side if one or more conditions associated with a minimum antenna gain are satisfied, where some interference mitigation techniques may be employed in the absence of a sufficient antenna gain. A third operating mode (which may be referred to as "C3") may be applicable for fixed networks (such as devices that communicate via backhaul links) and may be associated with an automatic transmit power control and link adaptation.

In some operating modes, such as the second operating mode, an LBT or LT sensing procedure may be skipped in accordance with a satisfaction of a narrow beam condition. Narrow beam-based channel access may involve one or more metrics or conditions used to enable narrow beam-based channel access. In some aspects, a narrowness aspect of a beam may be associated with a spherical effective isotropic radiated power (EIRP) measurements. For example, one or more metrics may be defined in accordance with statistics of EIRP measurements around a wireless device (such as around a wireless device in a testing environment, such as where a link antenna may be used for beam steering and a measurement antenna may be used for center or off-center beam measurements). In accordance with such statistical EIRP measurements, a wireless device may plot a cumulative distribution function (CDF) of a measured energy associated with the spherical EIRP measurements.

For example, considering EIRP measurements minus a constant b at different percentiles (such as at a $k_{1st}$ percentile, a $k_{2nd}$ percentile, and a $k_{3rd}$ percentile, where $k_3 < k_1$ and $k_2 < k_1$) of the distribution of radiated power measured over a sphere (such as a full or approximately full sphere) around a transmitter configured to use a beam j, the wireless device may measure or calculate a value $M_{j,1}$ and a value $M_{j,2}$. $M_{j,1}$ and $M_{j,2}$ may be defined in accordance with Equations 1 and 2, respectively, as shown below.

$$M_{j,1} = k_{1st} \cdot \text{tile}(\{EIRP_i : i \in E_j\}) - k_{2nd} \cdot \text{tile}(\{EIRP_i : i \in E_j\}) \quad (1)$$

$$M_{j,2} = k_{3rd} \cdot \text{tile}(\{EIRP_i - b : i \in E_j\}) \quad (2)$$

As shown in Equations 1 and 2, $E_j$ may be a set of EIRPs captured in a spherical measurement for a beam j and b may be a constant (such as an upper limit transmit power, such as $P_{max}$). $M_{j,1}$ may be a difference between an EIRP measurement at two different percentiles. For example, a given beam may be associated with a first EIRP measurement at a first percentile (such as at the $k_{1st}$ percentile) and a second EIRP measurement at a second percentile (such as at the $k_{2nd}$ percentile) and $M_{j,1}$ may express or indicate a difference between the first EIRP measurement and the second EIRP measurement. As such, $M_{j,1}$ may be a differential value. $M_{j,2}$ may express or indicate an antenna gain of the transmitter, which may be associated with an EIRP measurement of a given beam at a given percentile.

Accordingly, in operating modes in which a wireless device may skip an LBT or LT sensing procedure if a narrow beam condition is satisfied, the wireless device may use one or more criteria that are associated with indicating whether the narrow beam condition is satisfied. For example, the first wireless device 205 may perform a narrow beam condition detection 265 associated with the directional beam 220 to identify, select, ascertain, or otherwise determine whether the directional beam 220 satisfies a narrow beam condition in accordance with the criteria. A first criterion may indicate that the first wireless device 205 passes the narrow beam condition for the directional beam 220 if a total transmit power is less than a threshold transmit power (such as a threshold transmit power Y). A second criterion may indicate that the first wireless device 205 passes the narrow beam condition for the directional beam 220 if an $M_{j,1}$ value is greater than a threshold $M_{j,1}$ value (such as a threshold $M_{j,1}$ value X). A third criterion may indicate that the first wireless device 205 passes the narrow beam condition for the directional beam 220 if an MB value is greater than a threshold $M_{j,1}$ value (such as a threshold $M_{j,1}$ value X) or if an $M_{j,2}$ value is less than a threshold $M_{j,2}$ value (such as a threshold $M_{j,2}$ value Z). The first wireless device 205 may pass the narrow beam condition if the first wireless device 205 or the directional beam 220 satisfy any one or more of the criteria (such that passing may correspond to satisfying at least one criterion, passing at least two criteria, passing two specific criteria, or passing all three criteria). The various thresholds associated with the criteria may be stored at the first wireless device 205 (such as in accordance with a specification), may be configured at the first wireless device 205, or may be indicated to the first wireless device 205 (such as from the second wireless device 210).

In some systems, the first wireless device 205 (such as a UE 115) and the second wireless device 210 (such as a network entity 105) may exchange data and control information back and forth in a timely manner, which may be hindered if one or both of the wireless devices fail the narrow beam condition (and may thus be constrained to performing an LBT or LT sensing procedure prior to a transmission). For example, while network entities 105 may have sharp, narrow beams (such that beams used by a network entity 105 may pass a narrow beam condition relatively frequently), UEs 115 may have relatively wider beams and fail a narrow beam LBT-exempt channel access condition relatively frequently. For example, as illustrated by the signaling diagram 200, the first wireless device 205 may use a directional beam 220 that is relatively wider (in terms of geometric shape or an amount of interference potentially contributed from a transmission associated with the directional beam 220) than the directional beam 225 used by the second wireless device 210. As such, the second wireless device 210 may achieve lower latency in accordance with narrow beam LBT-exempt channel access, while the first wireless device 205 may experience difficulties in satisfying a condition associated with narrow beam LBT-exempt channel access. As a result, the first wireless device 205 may conduct or perform an LBT procedure prior to starting a transmission (such as an uplink transmission) to avoid interference with other devices sharing the wireless medium, which may adversely impact or limit some service types (such as URLLC service types).

As such, in some implementations, the first wireless device 205 and the second wireless device 210 may support one or more timing-related COT sharing conditions 270 according to which the first wireless device 205 may share a COT of the second wireless device 210 and access the channel, where the COT sharing conditions 270 may depend on whether the directional beam 220 of the first wireless device 205 satisfy a narrow beam condition. In other words, the first wireless device 205 and the second wireless device 210 may support a channel access and COT sharing mechanism according to which the first wireless device 205 may share the COT of the second wireless device 210 without conducting or performing an LBT or LT sensing procedure even if the directional beam 220 fails to satisfy a narrow beam condition. In some aspects, the COT sharing conditions 270 may include one or both of a time gap (such as a minimum or lower limit time gap) between consecutive transmissions or an upper limit transmission duration of a transmission from the first wireless device 205. Accordingly, in scenarios in which the first wireless device 205 is a UE 115 and the second wireless device 210 is a network entity 105, the wireless devices may support a downlink-to-uplink gap constraint and a UE maximum transmission duration when the wireless devices (the UE 115 and the network entity 105) share a COT and access the channel in accordance with a narrow beam channel condition.

For example, and as illustrated by the signaling diagram 200, the second wireless device 210 may transmit a message 230 to the first wireless device 205 during a COT of the second wireless device 210 and the first wireless device 205 may transmit, to the second wireless device 210 and during the COT of the second wireless device 210, a message 235. The first wireless device 205 may transmit the message 235 in accordance with a time gap 250 between the message 230 and the message 235 and the message 235 may be associated with a transmission duration 255 and, in some implementations, one or both of the time gap 250 and the transmission duration 255 may be associated with a width of the directional beam 220 (such as whether the directional beam 220 satisfies a narrow beam condition).

Further, the second wireless device 210 may transmit a message 240 (potentially without a time gap between the message 235 and the message 240) and the first wireless device 205 may transmit a message 245 during the COT of the second wireless device 210. The first wireless device 205 may transmit the message 245 in accordance with the time gap 250 between the message 240 and the message 245 and the message 245 may be associated with a transmission duration 260 and, in some implementations, one or both of the time gap 250 and the transmission duration 260 may be associated with the width of the directional beam 220. For example, the time gap 250 and an upper limit transmission duration (where both the transmission duration 255 and the transmission duration 260 are less than or equal to the upper limit transmission duration) may enable the first wireless device 205 to share the COT of the second wireless device 210 and a strictness or flexibility of the time gap 250 or the upper limit transmission duration may depend on the width of the directional beam 220 (such as whether the directional beam satisfies a narrow beam condition). As such, the first wireless device 205 may access the channel without performing an LBT or LT sensing procedure, even if the directional beam 220 fails the narrow beam condition, while not causing much interference (such as less than a threshold amount of interference) to other devices in the system.

Additional details relating to the various conditional restrictions associated with a time gap between a transmission from the second wireless device 210 and a transmission from the first wireless device 205 and an upper limit duration of the transmission from the first wireless device 205 are illustrated by and described with reference to FIGS. 3 and 4. Further, although example timing-related aspects are described with reference to FIGS. 3 and 4, the implementations described herein may be applicable to any units of time, including seconds, milliseconds, symbols, slots, frames, or TTIs. In the example of the signaling diagram 200, a duration of the message 230 and the message 240 may be set to $T_A$ or $\tilde{T}_{DL}$ (which may be 8 milliseconds as an example), the time gap 250 may be referred to as $T_g$, and a duration of the message 235 and the message 245 may be set to $T_B$ or $\tilde{T}_{UL}$ (which may be 2 milliseconds as an example). Generally, a transmission from the first wireless device 205 may be associated with a transmission duration $T_B$ and a transmission from the second wireless device 210 may be associated with a transmission duration $T_A$.

Figure 3:
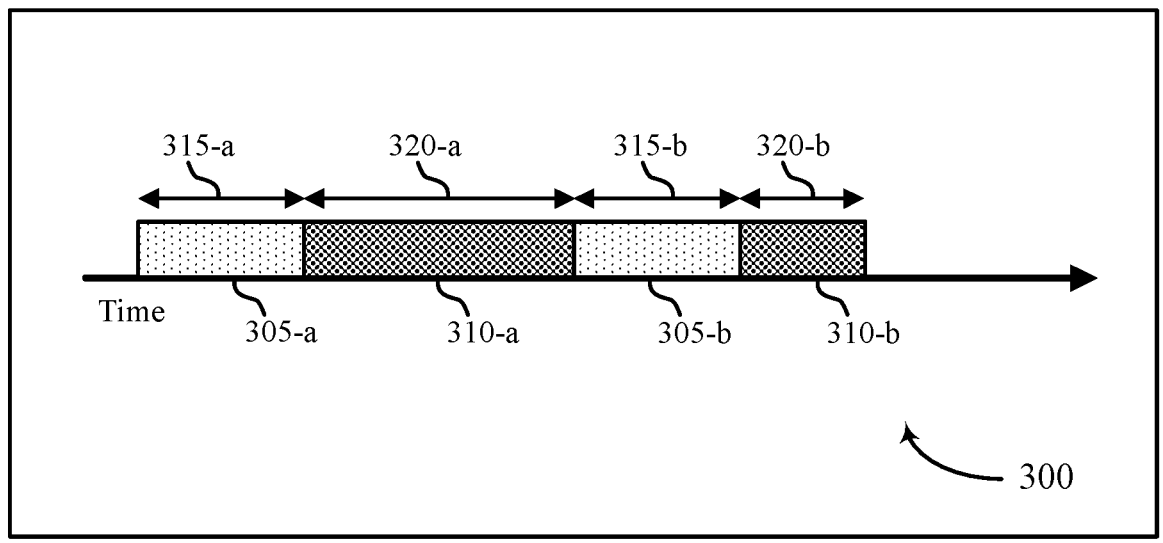
FIGS. 3 and 4 show example communication timelines that support channel occupancy sharing conditions for beam-based channel access.
Figure 3:
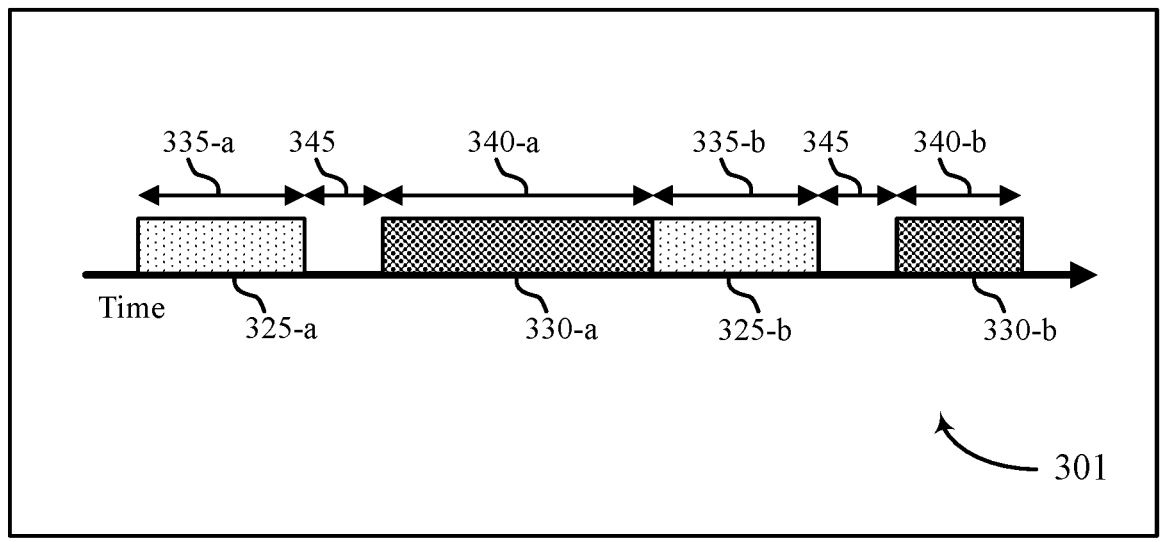

FIG. 3 shows example communication timelines 300 and 301 that support channel occupancy sharing conditions for beam-based channel access. The communication timelines 300 and 301 may implement or be implemented to realize aspects of the wireless communications system 100 or the signaling diagram 200. For example, the first wireless device 205 and the second wireless device 210 (as illustrated by and described with reference to FIG. 2) may transmit and receiving signaling in accordance with the communication timeline 300 or the communication timeline 301. In some implementations, the communication timelines 300 and 301 illustrate scenarios in which the directional beam 220 used by the first wireless device 205 satisfies a narrow beam condition and the second wireless device 210 is a COT-initiating device and satisfies the narrow beam condition (such that both the first wireless device 205 and the second wireless device 210 use narrow beams). In other words, the communication timelines 300 and 301 illustrate alternative COT sharing conditions 270 that the first wireless device 205 meets to share a COT with the second wireless device 210 in implementations in which the directional beam 220 satisfies the narrow beam condition.

As illustrated by the communication timeline 300, if the first wireless device 205 satisfies the narrow beam condition, the first wireless device 205 and the second wireless device 210 may share a COT without any time gap (such as any downlink-to-uplink time gap) constraint or without restricting a maximum or upper limit continuous transmission duration of the first wireless device 205. For example, the second wireless device 210 may transmit a message 305-*a* and the first wireless device 205 may transmit, during the COT of the second wireless device 210, a message 310-*a* without any time gap or without a restriction on a transmission duration of the message 310-*a*. Further, the second wireless device 210 may transmit a message 305-*b* and the first wireless device 205 may transmit, during the COT of the second wireless device 210, a message 310-*b* without any time gap or without a restriction on a transmission duration of the message 310-*b*. As an example, the message 305-*a* may have a transmission duration 315-*a* of 8 milliseconds, the message 310-*a* may have a transmission duration 320-*a* of 12 milliseconds, the message 305-*b* may have a transmission duration 315-*b* of 6 milliseconds, and the message 310-*b* may have a transmission duration 320-*b* of 4 milliseconds.

As illustrated by the communication timeline 301, if the first wireless device 205 satisfies the narrow beam condition, the first wireless device 205 and the second wireless device 210 may share a COT with a relatively small time gap 345, which may be denoted by $T_g$, to meet a processing capability of the first wireless device 205 without having a restriction on a maximum or upper limit continuous transmission duration of the first wireless device 205. In other words, the time gap 345 may be associated with a processing capability of the first wireless device 205 (and may not be supplemented, extended, or increased therefrom) in accordance with the directional beam 220 of the first wireless device 205 satisfying the narrow beam condition.

For example, the second wireless device 210 may transmit a message 325-*a* and the first wireless device 205 may transmit, during the COT of the second wireless device 210, a message 330-*a* with the time gap 345 between the message 325-*a* and the message 330-*a* and without any restriction on a transmission duration of the message 330-*a*. Further, the second wireless device 210 may transmit a message 325-*b* and the first wireless device 205 may transmit, during the COT of the second wireless device 210, a message 330-*b* with the time gap 345 between the message 325-*b* and the message 330-*b* and without any restriction on a transmission duration of the message 330-*b*. As an example, the message 325-*a* may have a transmission duration 335-*a* of 8 milliseconds, the message 330-*a* may have a transmission duration 340-*a* of 12 milliseconds, the message 325-*b* may have a transmission duration 335-*b* of 6 milliseconds, and the message 330-*b* may have a transmission duration 340-*b* of 4 milliseconds. For further example, the relatively small time gap 345 may have a duration $T_g$ of 0.25, 0.5, 1, 2, 3, or 4 milliseconds.

Figure 4:
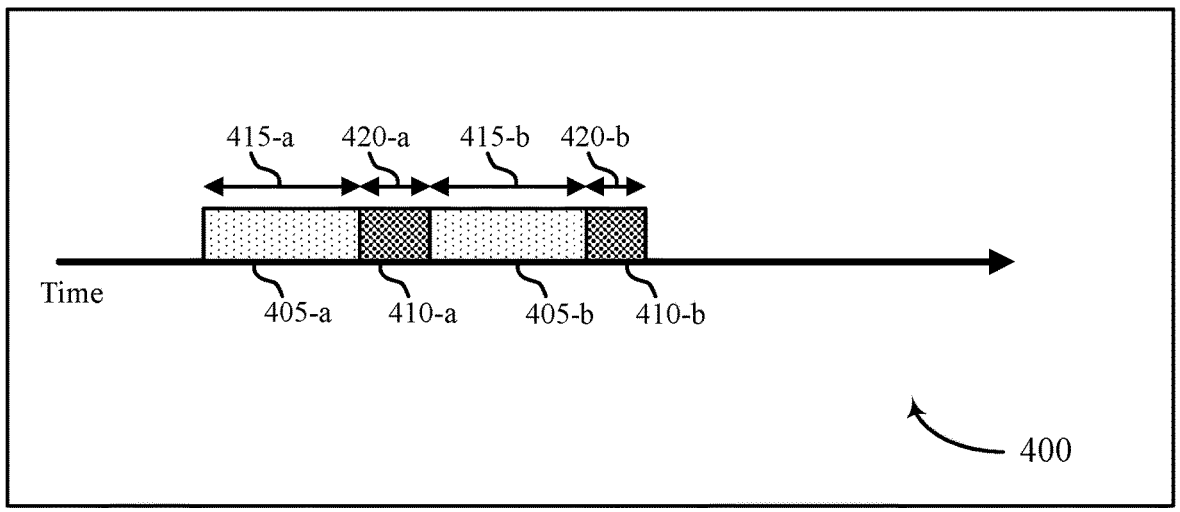
Figure 4:
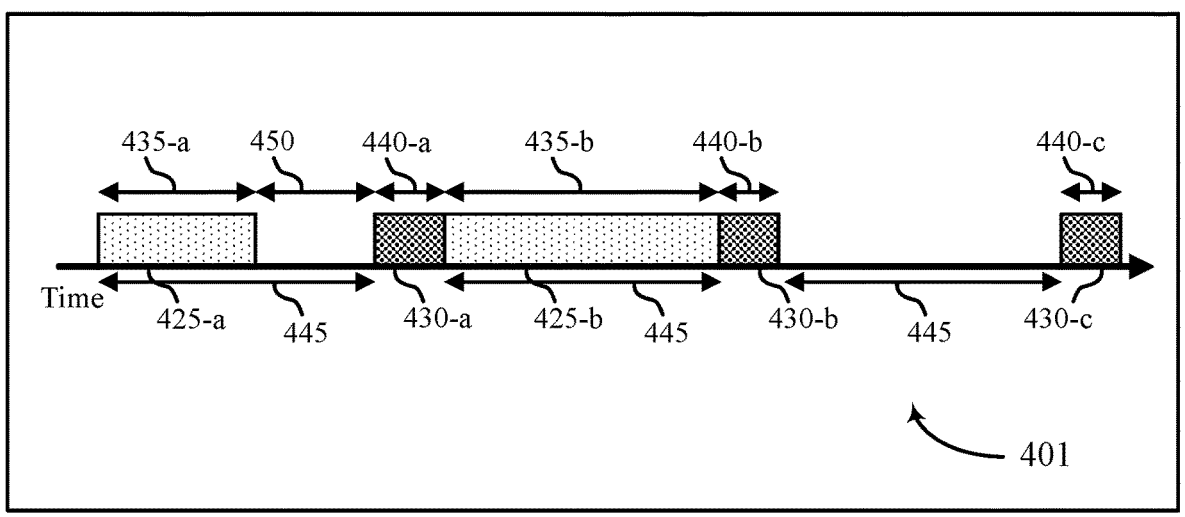
Figure 4:
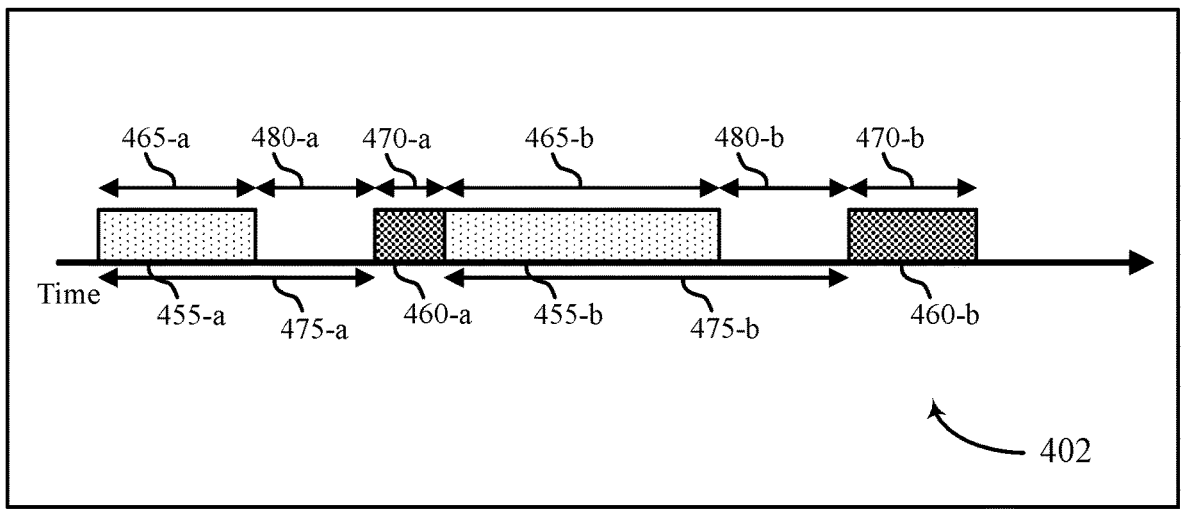

FIG. 4 shows example communication timelines 400, 401, and 402 that support channel occupancy sharing conditions for beam-based channel access. The communication timelines 400, 401, and 402 may implement or be implemented to realize aspects of the wireless communications system 100 or the signaling diagram 200. For example, the first wireless device 205 and the second wireless device 210 (as illustrated by and described with reference to FIG. 2) may transmit and receiving signaling in accordance with the communication timeline 400, the communication timeline 401, or the communication timeline 402. In some implementations, the communication timelines 400, 401, and 402 illustrate scenarios in which the directional beam 220 used by the first wireless device 205 fails to satisfy a narrow beam condition and the second wireless device 210 is a COT-initiating device. In other words, the communication timelines 400, 401, and 402 illustrate alternative COT sharing conditions 270 that the first wireless device 205 meets to share a COT with the second wireless device 210 in implementations in which the directional beam 220 fails the narrow beam condition.

As illustrated by the communication timeline 400, if the first wireless device 205 fails to satisfy a narrow beam condition, the first wireless device 205 and the second wireless device 210 may share a COT without any time gap (such as a downlink-to-uplink time gap) if a continuous transmission duration of the first wireless device 205 satisfies (such as is less than or equal to) an upper limit transmission duration $T_{B,max}$. In other words, the first wireless device 205 and the second wireless device 210 may support no gap constraint but a COT restriction. As an example, the upper limit transmission duration $T_{B,max}$ may be set to 0.5 milliseconds. As such, the first wireless device 205 may be able to transmit (such as send back) one or more latency-sensitive or critical messages to the second wireless device 210. Such latency-sensitive or critical messages may include acknowledgment (ACK) or negative ACK (NACK) feedback or control messages.

For example, the second wireless device 210 may transmit a message 405-*a* and the first wireless device 205 may transmit, during the COT of the second wireless device 210, a message 410-*a* without any time gap and in accordance with an upper limit transmission duration. Further, the second wireless device 210 may transmit a message 405-*b* and the first wireless device 205 may transmit, during the COT of the second wireless device 210, a message 410-*b* without any time gap and in accordance with an upper limit transmission duration. As an example, the message 405-*a* may have a transmission duration 415-*a* of 8 milliseconds, the message 410-*a* may have a transmission duration 420-*a* of 0.5 milliseconds, the message 405-*b* may have a transmission duration 415-*b* of 12 milliseconds, and the message 410-*b* may have a transmission duration 420-*b* of 0.25 milliseconds.

As illustrated by the communication timeline 401, if the first wireless device 205 fails to satisfy a narrow beam condition, the first wireless device 205 may wait at least a fixed gap duration $T_g^{(f)}$ prior to starting a transmission back to the second wireless device 210 and may transmit such that a continuous transmission duration of the first wireless device 205 satisfies (such as is less than or equal to) an upper limit transmission duration $T_{B,max}$. In other words, the first wireless device 205 and the second wireless device 210 may support a fixed gap constraint and a COT restriction). In some implementations, the fixed gap duration $T_g^{(f)}$ may be independent of a transmission duration $T_B$ of the first wireless device 205 and the first wireless device 205 may start a timer associated with the fixed gap duration $T_g^{(f)}$ as the first wireless device 205 stops a transmission. For example, the fixed gap duration $T_g^{(f)}$ may overlap with a transmission by the second wireless device 210 in accordance with the second wireless device 210 using the directional beam 225 that satisfies a narrow beam condition. In some aspects, $T_{B,max}$ may be relatively more relaxed in accordance with employing the fixed gap duration $T_g^{(f)}$. For example, the upper limit transmission duration $T_{B,max}$ may be 4 milliseconds. In some aspects, the introduction of the time gap $T_g^{(f)}$ may reduce interference with devices from other cells or radio access technologies (RATs) and give such devices more opportunities to use the channel.

For example, the second wireless device 210 may transmit a message 425-a and the first wireless device 205 may transmit, during the COT of the second wireless device 210, a message 430-a in accordance with a time gap 445 (which may be associated with a fixed gap duration $T_g^{(f)}$) and an upper limit transmission duration. In accordance with transmitting the message 430-a, the first wireless device 205 may start a timer associated with the time gap 445 (such that the time gap 445 may continue to run while the second wireless device 210 transmits). The second wireless device 210 may transmit a message 425-b (such as during the time gap 445) and the first wireless device 205 may transmit, during the COT of the second wireless device 210, a message 430-b in accordance with the time gap 445 (measured from the message 430-a) and the upper limit transmission duration. The first wireless device may (re)start a timer associated with the time gap 445 in accordance with transmitting the message 430-b and, in some implementations, may transmit, during the COT of the second wireless device 210, a message 430-c in accordance with the time gap 445 (measured from the message 430-b) and the upper limit transmission duration.

As an example, the message 425-a may be associated with a transmission duration 435-a of 8 milliseconds, the message 430-a may be associated with a transmission duration 440-a of 2 milliseconds, the message 425-b may be associated with a transmission duration 435-b of 12 milliseconds, the message 430-a may be associated with a transmission duration 440-b of 4 milliseconds, and the message 430-c may be associated with a transmission duration 440-c of 4 milliseconds. The time gap 445 (which may be denoted as $T_g^{(f)}$) may be 12 milliseconds. As such, and in accordance with the time gap 445 running while the second wireless device 210 is able to transmit a time gap 450 (which may be denoted as $T_g$) between the message 425-a and the message 430-a may be 4 milliseconds.

As illustrated by the communication timeline 402, if the first wireless device 205 fails to satisfy a narrow beam condition, the first wireless device 205 may wait at least for a variable gap duration $T_g^{(v)}$ prior to starting a transmission back to the second wireless device 210. In some implementations, the variable gap duration $T_g^{(v)}$ may be proportional to a continuous transmission duration $T_B$ of the first wireless device 205. For example, the variable gap duration $T_g^{(v)}$ may be defined such that $T_g^{(v)} = \alpha_B T_B$, where $\alpha_B$ is a multiplier value. In accordance with using a variable gap duration $T_g^{(v)}$ an upper limit transmission duration $T_{B,max}$ may be relatively more relaxed as compared to implementations in which a fixed gap duration $T_g^{(f)}$ is used). For example, upper limit transmission duration $T_{B,max}$ may be equal to 10 milliseconds. As such, the first wireless device 205 and the second wireless device 210 may support a variable gap constraint and a COT restriction. Further, in accordance with using a variable gap duration $T_g^{(v)}$, the first wireless device 205 and the second wireless device 210 may balance channel utilization and reducing interference with devices from other cells or RATs. In some implementations, the variable gap duration $T_g^{(v)}$ may overlap with a transmission from the second wireless device 210 in accordance with the directional beam 225 used by the second wireless device 210 satisfying a narrow beam condition.

For example, the second wireless device 210 may transmit a message 455-a and the first wireless device 205 may transmit, during the COT of the second wireless device 210, a message 460-a in accordance with a time gap 475-a (which may be associated with a variable gap duration $T_g^{(v)}$) and an upper limit transmission duration. In accordance with transmitting the message 460-a, the first wireless device 205 may start a timer associated with another variable gap duration, which the first wireless device 205 may calculate in accordance with a transmission duration 470-b of a message 460-b (a next or subsequent message to be transmitted from the first wireless device 205). The second wireless device 210 may transmit a message 455-b and the first wireless device 205 may transmit, during the COT of the second wireless device 210, the message 460-b in accordance with a time gap 475-b and an upper limit transmission duration. In some implementations, the first wireless device 205 (and the second wireless device 210) may calculate a duration of the time gap 475-a in accordance with a transmission duration 470-a of the message 460-a and may calculate a duration of the time gap 475-b in accordance with the transmission duration 470-b of the message 460-b.

As an example, the message 455-a may be associated with a transmission duration 465-a of 8 milliseconds, the message 460-a may be associated with a transmission duration 470-a of 3 milliseconds, the message 455-b may be associated with a transmission duration 465-b of 12 milliseconds, and the message 460-b may be associated with a transmission duration 470-b of 6 milliseconds. Accordingly, if the multiplier value $\alpha_B$ is equal to 3, the time gap 475-a may have a duration of 9 milliseconds and the time gap 475-b may have a duration of 18 milliseconds. Accordingly, a time gap 480-a between the message 455-a and the message 460-a may be 1 millisecond and a time gap 480-b between the message 455-b and the message 460-b may be 6 milliseconds.

In some implementations, the first wireless device 205 and the second wireless device 210 may support one or more configuration- or signaling-based mechanisms associated with acquiring the various parameters or metrics associated with the COT sharing conditions 270 according to which the first wireless device 205 may share a COT of the second wireless device 210. For example, the first wireless device 205 may store (such as in accordance with a regulation or network specification) any one or more of a value of a fixed gap duration $T_g^{(f)}$, a value of an upper limit transmission duration $T_{B,max}$, or a value of a multiplier value $\alpha_B$. Additionally, or alternatively, the first wireless device 205 may receive (such as via control signaling from the second wireless device 210) an indication of any one or more of a value of a fixed gap duration $T_g^{(f)}$, a value of an upper limit transmission duration $T_{B,max}$, or a value of a multiplier value $\alpha_B$. Such control signaling that the first wireless device 205 may receive from the second wireless device 210 may include any one or more of RRC signaling, downlink control information (DCI), or a MAC control element (MAC-CE).

Figure 5:
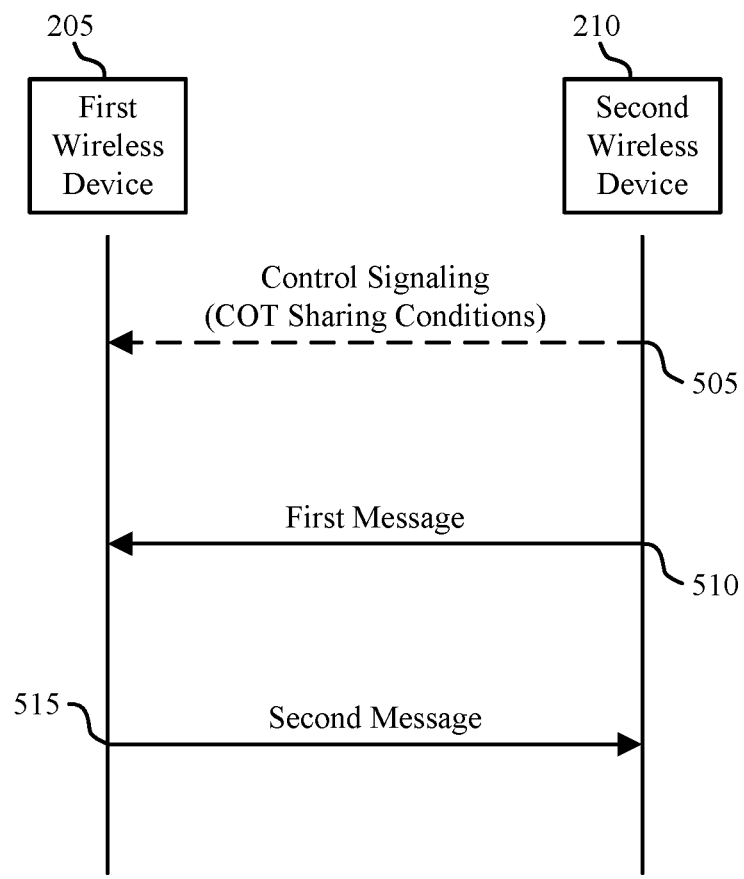
FIG. 5 shows an example process flow that supports channel occupancy sharing conditions for beam-based channel access.

FIG. 5 shows an example process flow 500 that supports channel occupancy sharing conditions for beam-based channel access. The process flow 500 may implement or be implemented to realize aspects of the wireless communications system 100, the signaling diagram 200, one or more of the communication timelines 300 and 301, or one or more of the communication timelines 400, 401, and 402. For example, the process flow 500 illustrates communication between the first wireless device 205 and the second wireless device 210 as illustrated by or described with reference to FIGS. 1-4. In some implementations, the first wireless device 205 and the second wireless device 210 may support one or more COT sharing conditions for narrow beam-based directional channel access that may apply to scenarios in which a directional beam satisfies a narrow beam condition and scenarios in which a directional beam fails to satisfy a narrow beam condition.

In the following description of the process flow 500, the operations may be performed (such as reported or provided) in a different order than the order shown, or the operations performed by the example devices may be performed in different orders or at different times. For example, specific operations also may be left out of the process flow 500, or other operations may be added to the process flow 500. Further, although some operations or signaling may be shown to occur at different times for discussion purposes, these operations may actually occur at the same time.

At 505, the first wireless device 205 may receive, from the second wireless device 210, control signaling indicating one or more parameters or metrics associated with one or more COT sharing conditions relating to a width of the directional beam 220 used by the first wireless device 205. In some implementations, the control signaling may indicate any one or more of a value of a fixed gap duration $T_g^{(f)}$, a value of an upper limit transmission duration $T_{B,max}$, or a value of a multiplier value $\alpha_B$. Such control signaling may be sent via one or more of RRC signaling, DCI, or a MAC-CE.

At 510, the first wireless device 205 may receive, from the second wireless device 210, a first message using a shared wireless channel and during a COT associated with communication between the first wireless device 205 and the second wireless device 210. The first message may be a control message, a data message, or any other signaling associated with or that indicates that the second wireless device 210 has initiated a COT for communication between the first wireless device 205 and the second wireless device 210.

At 515, the first wireless device 205 may transmit, to the second wireless device 210, a second message using the shared wireless channel and during the COT associated with the communication between the first wireless device 205 and the second wireless device 210. The first wireless device 205 may transmit the second message to the second wireless device 210 using a directional beam (such as a directional beam 220 as illustrated by and described with reference to FIG. 2) and, in some implementations, one or both of a time gap between the first message and the second message or an upper limit transmission duration (such as an upper limit continuous transmission duration) of the second message may be associated with a width of the directional beam. In other words, one or both of the time gap or the upper limit transmission duration may be associated with whether the directional beam of the first wireless device 205 satisfies a narrow beam condition. Additional details relating to potential time gaps and upper limit transmission durations are illustrated by and described with reference to FIGS. 2-4.

Figure 6:
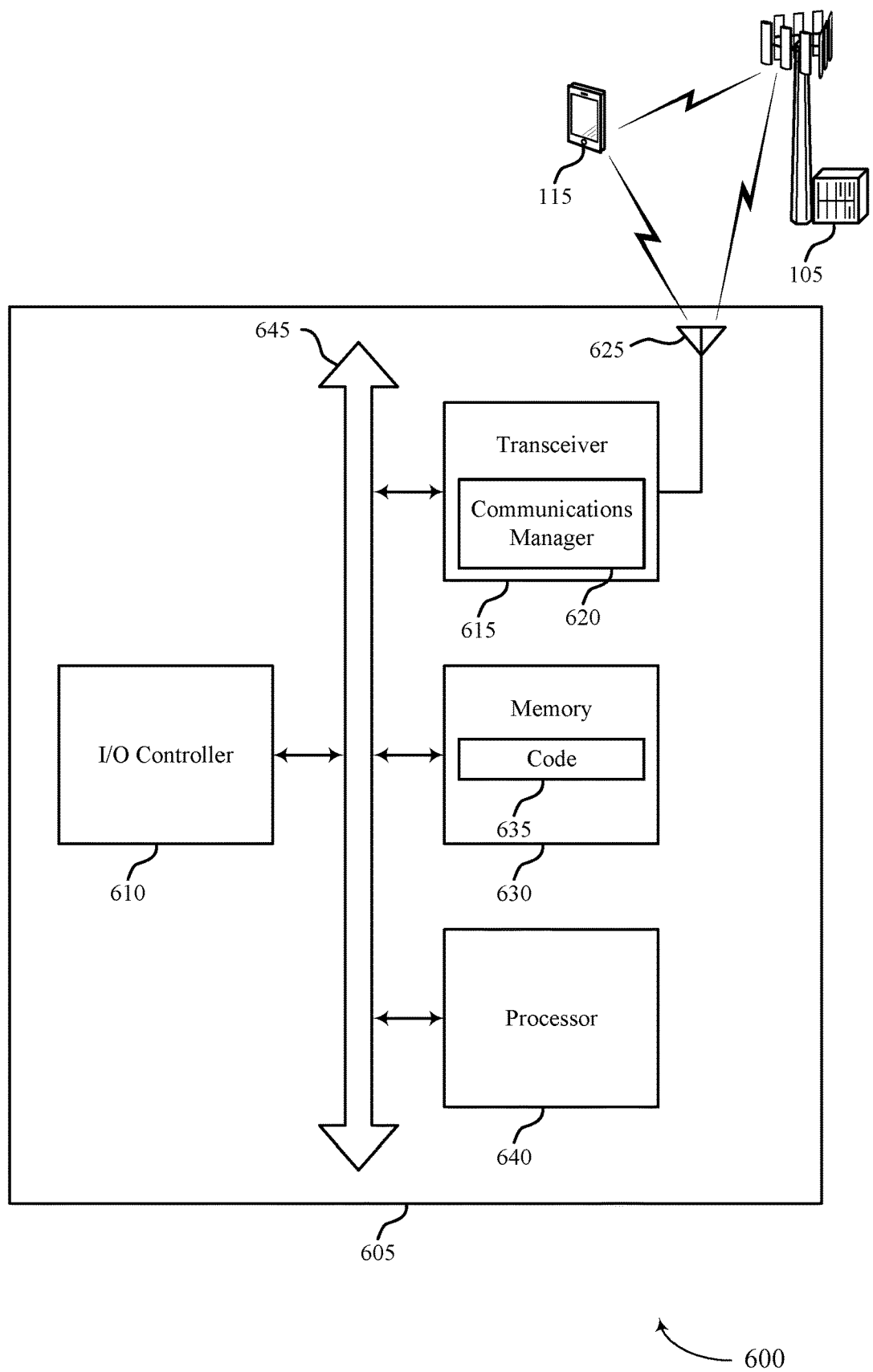
FIGS. 6 and 7 show block diagrams of example devices that support channel occupancy sharing conditions for beam-based channel access.

FIG. 6 shows a block diagram 600 of an example device 605 that supports channel occupancy sharing conditions for beam-based channel access. The device 605 may communicate (such as wirelessly) with one or more network entities (such as one or more components of one or more network entities 105), one or more UEs 115, or any combination thereof. The device 605 may include components for bi-directional voice and data communications including components for transmitting and receiving communications, such as a communications manager 620, an input/output (I/O) controller 610, a transceiver 615, an antenna 625, a memory 630, code 635, and a processor 640. These components may be in electronic communication or otherwise coupled (such as operatively, communicatively, functionally, electronically, electrically) via one or more buses (such as a bus 645).

The I/O controller 610 may manage input and output signals for the device 605. The I/O controller 610 also may manage peripherals not integrated into the device 605. In some implementations, the I/O controller 610 may represent a physical connection or port to an external peripheral. In some implementations, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some implementations, the I/O controller 610 may be implemented as part of a processor or processing system, such as the processor 640. In some implementations, a user may interact with the device 605 via the I/O controller 610 or via hardware components controlled by the I/O controller 610.

In some implementations, the device 605 may include a single antenna 625. However, in some other implementations, the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625. In some implementations, the transceiver 615 may include one or more interfaces, such as one or more interfaces coupled with the one or more antennas 625 that are configured to support various receiving or obtaining operations, or one or more interfaces coupled with the one or more antennas 625 that are configured to support various transmitting or outputting operations, or a combination thereof. In some implementations, the transceiver 615 may include or be configured for coupling with one or more processors or memory components that are operable to perform or support operations based on received or obtained information or signals, or to generate information or other signals for transmission or other outputting, or any combination thereof. In some implementations, the transceiver 615, or the transceiver 615 and the one or more antennas 625, or the transceiver 615 and the one or more antennas 625 and one or more processors or memory components (such as the processor 640, or the memory 630, or both), may be included in a chip or chip assembly that is installed in the device 605.

The memory 630 may include random access memory (RAM) and read-only memory (ROM). The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some implementations, the code 635 may not be directly executable by the processor 640 but may cause a computer (such as when compiled and executed) to perform functions described herein. In some implementations, the memory 630 may contain, among other things, a basic I/O system (BIOS) which may control basic hardware or software operation such as the interaction with peripheral components or devices.

The processor 640 may include an intelligent hardware device (such as a general-purpose processor, a digital signal processor (DSP), an application-specific integrated circuit (ASIC), a central processing unit (CPU), a field-programmable gate array (FPGA), a microcontroller, a programmable logic device, discrete gate or transistor logic, a discrete hardware component, or any combination thereof). In some implementations, the processor 640 may be configured to operate a memory array using a memory controller. In some other implementations, a memory controller may be integrated into the processor 640. The processor 640 may be configured to execute computer-readable instructions stored in a memory (such as the memory 630) to cause the device 605 to perform various functions (such as functions or tasks supporting channel occupancy sharing conditions for beam-based channel access). For example, the device 605 or a component of the device 605 may include a processor 640 and memory 630 coupled with the processor 640, the processor 640 and memory 630 configured to perform various functions described herein. The processor 640 may be an example of a cloud-computing platform (such as one or more physical nodes and supporting software such as operating systems, virtual machines, or container instances) that may host the functions (such as by executing code 635) to perform the functions of the device 605. The processor 640 may be any one or more suitable processors capable of executing scripts or instructions of one or more software programs stored in the device 605 (such as within the memory 630). In some implementations, the processor 640 may be a component of a processing system. A processing system may generally refer to a system or series of machines or components that receives inputs and processes the inputs to produce a set of outputs (which may be passed to other systems or components of, for example, the device 605). For example, a processing system of the device 605 may refer to a system including the various other components or subcomponents of the device 605, such as the processor 640, or the transceiver 615, or the communications manager 620, or other components or combinations of components of the device 605.

The processing system of the device 605 may interface with other components of the device 605, and may process information received from other components (such as inputs or signals) or output information to other components. For example, a chip or modem of the device 605 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 605 may transmit information output from the chip or modem. Additionally, or alternatively, in some implementations, the one or more interfaces may refer to an interface between the processing system of the chip or modem and a receiver, such that the device 605 may obtain information or signal inputs, and the information may be passed to the processing system. A person having ordinary skill in the art will readily recognize that a first interface also may obtain information or signal inputs, and a second interface also may output information or signal outputs.

The communications manager 620 may support wireless communication at a first device in accordance with examples as disclosed herein. For example, the communications manager 620 may be configured as or otherwise support a means for receiving a first message using a shared wireless channel and during a COT associated with communication between the first device and a second device. The communications manager 620 may be configured as or otherwise support a means for transmitting, via a directional beam, a second message using the shared wireless channel and during the COT associated with the communication between the first device and the second device, where one or both of a time gap between the first message and the second message or an upper limit transmission duration of the second message is associated with a width of the directional beam.

In some implementations, the communications manager 620 may be configured as or otherwise support a means for receiving, from the second device, an indication of one or both of the time gap or the upper limit transmission duration of the second message, where both the time gap and the upper limit transmission duration of the second message are associated with the width of the directional beam.

In some implementations, to support transmitting the second message, the communications manager 620 may be configured as or otherwise support a means for setting the time gap to any duration in accordance with the width of the directional beam satisfying a narrow beam condition, where a transmission duration of the second message is unrestricted in accordance with the width of the directional beam satisfying the narrow beam condition.

In some implementations, to support transmitting the second message, the communications manager 620 may be configured as or otherwise support a means for setting the time gap to a non-zero duration in accordance with the width of the directional beam satisfying a narrow beam condition, where the non-zero duration is associated with a processing capability of the first device, and where a transmission duration of the second message is unrestricted in accordance with the width of the directional beam satisfying the narrow beam condition.

In some implementations, to support transmitting the second message, the communications manager 620 may be configured as or otherwise support a means for setting the time gap to a first duration in accordance with the width of the directional beam failing to satisfy a narrow beam condition.

In some implementations, the first duration is any value in accordance with a transmission duration of the second message being less than the upper limit transmission duration.

In some implementations, the first duration is a non-zero duration. In some implementations, a transmission duration of the second message is less than or equal to the upper limit transmission duration in accordance with the width of the directional beam failing to satisfy the narrow beam condition.

In some implementations, the first duration is proportional to a transmission duration of the second message. In some implementations, the transmission duration of the second message is less than or equal to the upper limit transmission duration in accordance with the width of the directional beam failing to satisfy the narrow beam condition.

In some implementations, the communications manager 620 may be configured as or otherwise support a means for receiving, from the second device, an indication of a multiplier value associated with the first duration, where the first duration is equal to a product of the multiplier value and the transmission duration of the second message.

In some implementations, a multiplier value associated with the first duration is stored at the first device. In some implementations, the first duration is equal to a product of the multiplier value and the transmission duration of the second message.

In some implementations, one or both of the time gap or the upper limit transmission duration of the second message are stored at the first device. In some implementations, both the time gap and the upper limit transmission duration of the second message are associated with the width of the directional beam.

In some implementations, the width of the directional beam fails to satisfy a narrow beam condition. In some implementations, the time gap between the first message and the second message or the upper limit transmission duration of the second message, or both, enables the first device to share the COT with the second device without channel sensing.

In some implementations, the communications manager 620 may be configured to perform various operations (such as receiving, monitoring, transmitting) using or otherwise in cooperation with the transceiver 615, the one or more antennas 625, or any combination thereof. Although the communications manager 620 is illustrated as a separate component, in some implementations, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of channel occupancy sharing conditions for beam-based channel access as described herein, or the processor 640 and the memory 630 may be otherwise configured to perform or support such operations.

Figure 7:
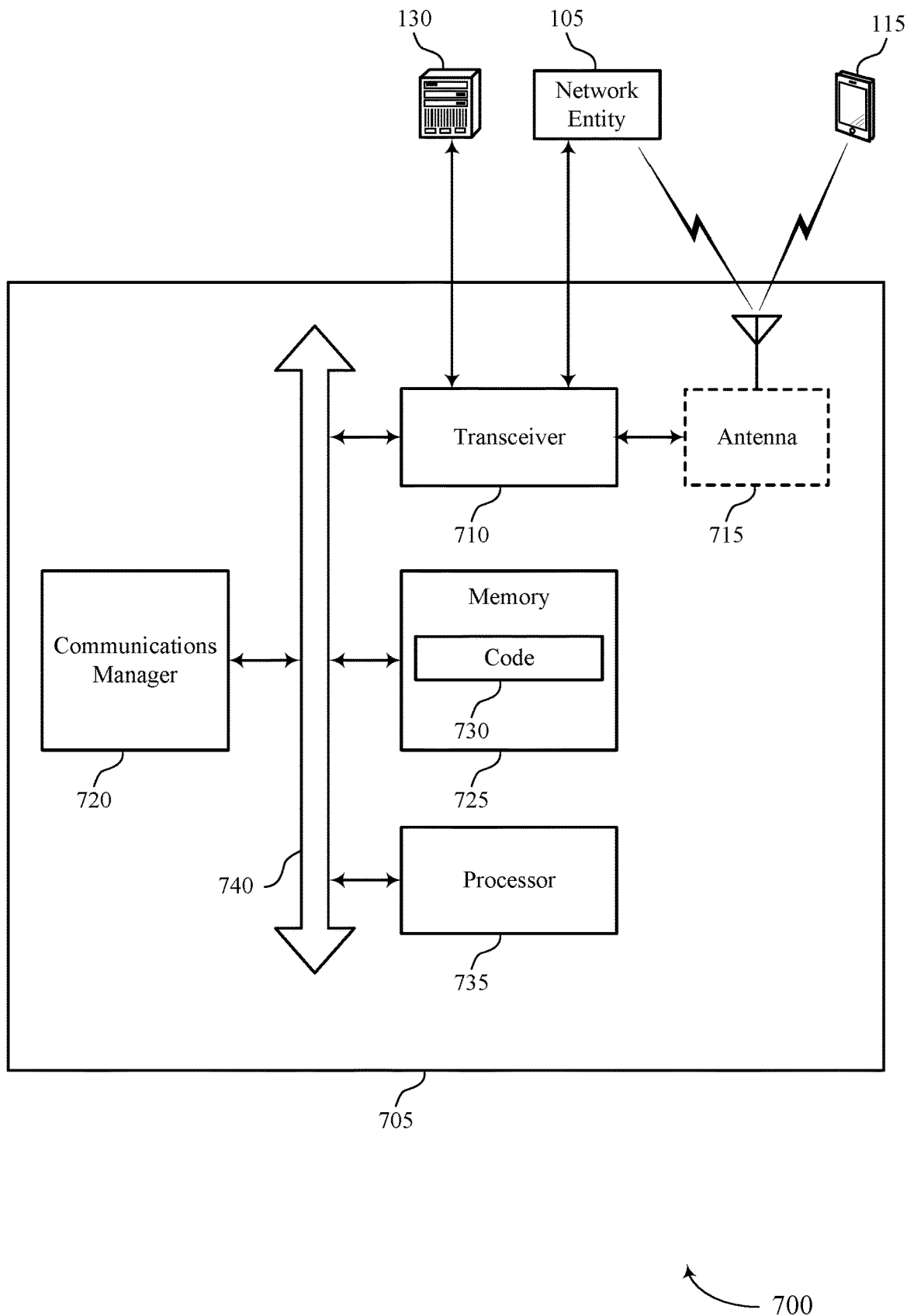

FIG. 7 shows a block diagram 700 of an example device 705 that supports channel occupancy sharing conditions for beam-based channel access. The device 705 may communicate with one or more network entities (such as one or more components of one or more network entities 105), one or more UEs 115, or any combination thereof, which may include communications over one or more wired interfaces, over one or more wireless interfaces, or any combination thereof. The device 705 may include components that support outputting and obtaining communications, such as a communications manager 720, a transceiver 710, an antenna 715, a memory 725, code 730, and a processor 735. These components may be in electronic communication or otherwise coupled (such as operatively, communicatively, functionally, electronically, electrically) via one or more buses (such as a bus 740).

The transceiver 710 may support bi-directional communications via wired links, wireless links, or both as described herein. In some implementations, the transceiver 710 may include a wired transceiver and may communicate bi-directionally with another wired transceiver. Additionally, or alternatively, in some examples, the transceiver 710 may include a wireless transceiver and may communicate bi-directionally with another wireless transceiver. In some implementations, the device 705 may include one or more antennas 715, which may be capable of transmitting or receiving wireless transmissions (such as concurrently). The transceiver 710 also may include a modem to modulate signals, to provide the modulated signals for transmission (such as by one or more antennas 715, by a wired transmitter), to receive modulated signals (such as from one or more antennas 715, from a wired receiver), and to demodulate signals.

In some implementations, the transceiver 710 may include one or more interfaces, such as one or more interfaces coupled with the one or more antennas 715 that are configured to support various receiving or obtaining operations, or one or more interfaces coupled with the one or more antennas 715 that are configured to support various transmitting or outputting operations, or a combination thereof. In some implementations, the transceiver 710 may include or be configured for coupling with one or more processors or memory components that are operable to perform or support operations based on received or obtained information or signals, or to generate information or other signals for transmission or other outputting, or any combination thereof. In some implementations, the transceiver 710, or the transceiver 710 and the one or more antennas 715, or the transceiver 710 and the one or more antennas 715 and one or more processors or memory components (such as the processor 735, or the memory 725, or both), may be included in a chip or chip assembly that is installed in the device 705. In some implementations, the transceiver may be operable to support communications via one or more communications links (such as a communication link 125, a backhaul communication link 120, a midhaul communication link 162, a fronthaul communication link 168).

The memory 725 may include RAM and ROM. The memory 725 may store computer-readable, computer-executable code 730 including instructions that, when executed by the processor 735, cause the device 705 to perform various functions described herein. The code 730 may be stored in a non-transitory computer-readable medium such as system memory or another type of memory. In some implementations, the code 730 may not be directly executable by the processor 735 but may cause a computer (such as when compiled and executed) to perform functions described herein. In some implementations, the memory 725 may contain, among other things, a BIOS which may control basic hardware or software operation such as the interaction with peripheral components or devices.

The processor 735 may include an intelligent hardware device (such as a general-purpose processor, a DSP, an ASIC, a CPU, an FPGA, a microcontroller, a programmable logic device, discrete gate or transistor logic, a discrete hardware component, or any combination thereof). In some implementations, the processor 735 may be configured to operate a memory array using a memory controller. In some other implementations, a memory controller may be integrated into the processor 735. The processor 735 may be configured to execute computer-readable instructions stored in a memory (such as the memory 725) to cause the device 705 to perform various functions (such as functions or tasks supporting channel occupancy sharing conditions for beam-based channel access). For example, the device 705 or a component of the device 705 may include a processor 735 and memory 725 coupled with the processor 735, the processor 735 and memory 725 configured to perform various functions described herein. The processor 735 may be an example of a cloud-computing platform (such as one or more physical nodes and supporting software such as operating systems, virtual machines, or container instances) that may host the functions (such as by executing code 730) to perform the functions of the device 705. The processor 735 may be any one or more suitable processors capable of executing scripts or instructions of one or more software programs stored in the device 705 (such as within the memory 725). In some implementations, the processor 735 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705, such as the processor 735, or the transceiver 710, or the communications manager 720, or other components or combinations of components of the device 705. The processing system of the device 705 may interface with other components of the device 705, and may process information received from other components (such as inputs or signals) or output information to other components. For example, a chip or modem of the device 705 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 705 may transmit information output from the chip or modem. Additionally, or alternatively, in some implementations, the one or more interfaces may refer to an interface between the processing system of the chip or modem and a receiver, such that the device 705 may obtain information or signal inputs, and the information may be passed to the processing system. A person having ordinary skill in the art will readily recognize that a first interface also may obtain information or signal inputs, and a second interface also may output information or signal outputs.

In some implementations, a bus 740 may support communications of (such as within) a protocol layer of a protocol stack. In some implementations, a bus 740 may support communications associated with a logical channel of a protocol stack (such as between protocol layers of a protocol stack), which may include communications performed within a component of the device 705, or between different components of the device 705 that may be co-located or located in different locations (such as where the device 705 may refer to a system in which one or more of the communications manager 720, the transceiver 710, the memory 725, the code 730, and the processor 735 may be located in one of the different components or divided between different components).

In some implementations, the communications manager 720 may manage aspects of communications with a core network 130 (such as via one or more wired or wireless backhaul links). For example, the communications manager 720 may manage the transfer of data communications for client devices, such as one or more UEs 115. In some implementations, the communications manager 720 may manage communications with other network entities 105, and may include a controller or scheduler for controlling communications with UEs 115 in cooperation with other network entities 105. In some implementations, the communications manager 720 may support an X2 interface within an LTE/LTE-A wireless communications network technology to provide communication between network entities 105.

The communications manager 720 may support wireless communications in accordance with examples as disclosed herein. For example, the communications manager 720 may be configured as or otherwise support a means for transmitting, to a first device from a second device, a first message using a shared wireless channel and during a COT associated with communication between the first device and the second device. The communications manager 720 may be configured as or otherwise support a means for receiving, from the first device via a directional beam, a second message using the shared wireless channel and during the COT associated with the communication between the first device and the second device, where one or both of a time gap between the first message and the second message or an upper limit transmission duration of the second message is associated with a width of the directional beam.

In some implementations, the communications manager 720 may be configured as or otherwise support a means for transmitting, to the first device, an indication of one or both of the time gap or the upper limit transmission duration of the second message, where both the time gap and the upper limit transmission duration of the second message are associated with the width of the directional beam.

In some implementations, to support receiving the second message, the communications manager 720 may be configured as or otherwise support a means for setting the time gap to any value in accordance with the width of the directional beam satisfying a narrow beam condition, where a transmission duration of the second message is unrestricted in accordance with the width of the directional beam satisfying the narrow beam condition.

In some implementations, to support receiving the second message, the communications manager 720 may be configured as or otherwise support a means for setting the time gap to a non-zero duration in accordance with the width of the directional beam satisfying a narrow beam condition, where the non-zero duration is associated with a processing capability of the first device, and where a transmission duration of the second message is unrestricted in accordance with the width of the directional beam satisfying the narrow beam condition.

In some implementations, to support receiving the second message, the communications manager 720 may be configured as or otherwise support a means for setting the time gap to a first duration in accordance with the width of the directional beam failing to satisfy a narrow beam condition.

In some implementations, the first duration is any value in accordance with a transmission duration of the second message being less than the upper limit transmission duration.

In some implementations, the first duration is a non-zero duration. In some implementations, a transmission duration of the second message is less than or equal to the upper limit transmission duration in accordance with the width of the directional beam failing to satisfy the narrow beam condition.

In some implementations, the first duration is proportional to a transmission duration of the second message. In some implementations, the transmission duration of the second message is less than or equal to the upper limit transmission duration in accordance with the width of the directional beam failing to satisfy the narrow beam condition.

In some implementations, the communications manager 720 may be configured as or otherwise support a means for transmitting, to the first device, an indication of a multiplier value associated with the first duration, where the first duration is equal to a product of the multiplier value and the transmission duration of the second message.

In some implementations, a multiplier value associated with the first duration is stored at the second device. In some implementations, the first duration is equal to a product of the multiplier value and the transmission duration of the second message.

In some implementations, one or both of the time gap or the upper limit transmission duration of the second message are stored at the second device. In some implementations, both the time gap and the upper limit transmission duration of the second message are associated with the width of the directional beam.

In some implementations, the width of the directional beam fails to satisfy a narrow beam condition. In some implementations, the time gap between the first message and the second message or the upper limit transmission duration of the second message, or both, enables the first device to share the COT with the second device without channel sensing.

In some implementations, the communications manager 720 may be configured to perform various operations (such as receiving, obtaining, monitoring, outputting, transmitting) using or otherwise in cooperation with the transceiver 710, the one or more antennas 715 (such as where applicable), or any combination thereof. Although the communications manager 720 is illustrated as a separate component, in some examples, one or more functions described with reference to the communications manager 720 may be supported by or performed by the processor 735, the memory 725, the code 730, the transceiver 710, or any combination thereof. For example, the code 730 may include instructions executable by the processor 735 to cause the device 705 to perform various aspects of channel occupancy sharing conditions for beam-based channel access as described herein, or the processor 735 and the memory 725 may be otherwise configured to perform or support such operations.

Figure 8:
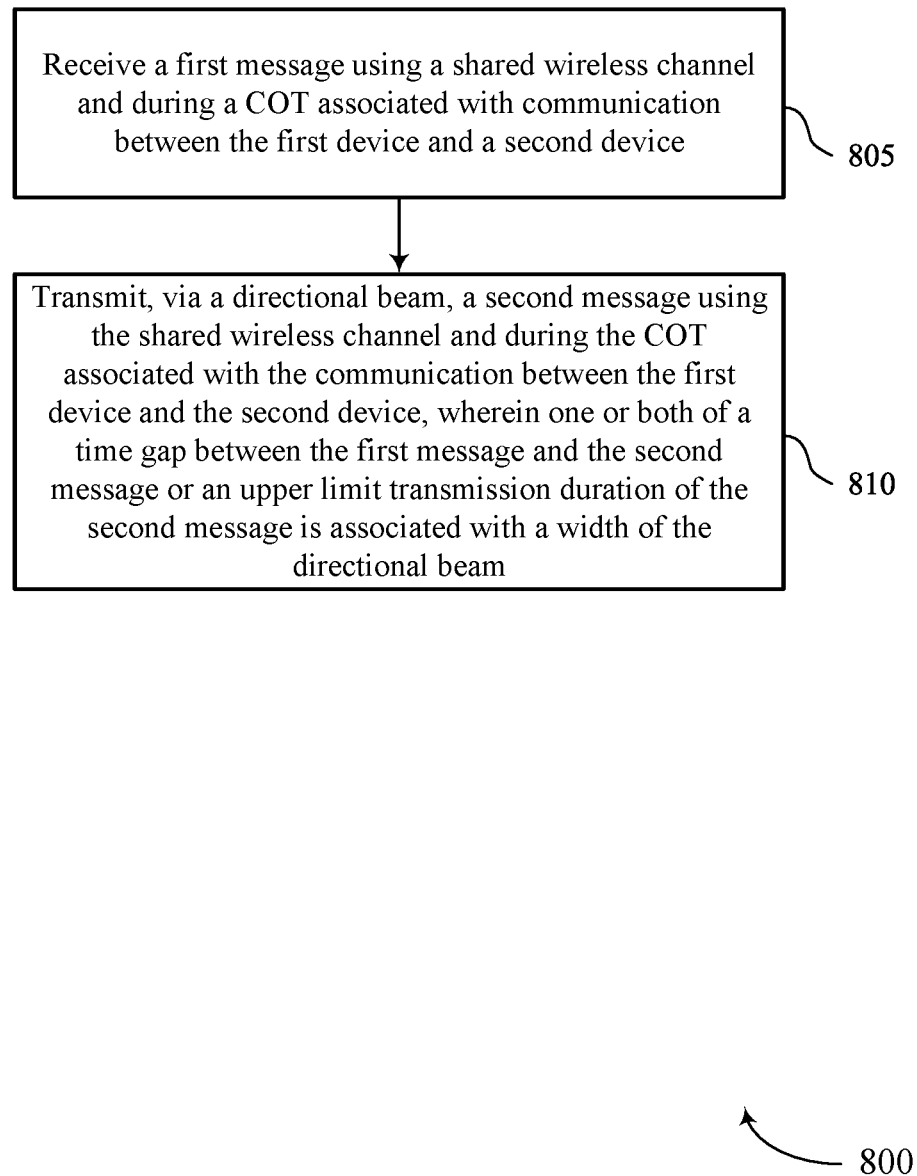
FIGS. 8 and 9 show flowcharts illustrating example methods that support channel occupancy sharing conditions for beam-based channel access.

FIG. 8 shows a flowchart illustrating an example method 800 that supports channel occupancy sharing conditions for beam-based channel access. The operations of the method 800 may be implemented by a UE or its components as described herein. For example, the operations of the method 800 may be performed by a UE 115 as described with reference to FIGS. 1-6. In some implementations, a UE may execute a set of instructions to control the functional elements of the UE to perform the described functions. Additionally, or alternatively, the UE may perform aspects of the described functions using special-purpose hardware.

At 805, the method may include receiving a first message using a shared wireless channel and during a COT associated with communication between the first device and a second device. The operations of 805 may be performed in accordance with examples as disclosed herein.

At 810, the method may include transmitting, via a directional beam, a second message using the shared wireless channel and during the COT associated with the communication between the first device and the second device, where one or both of a time gap between the first message and the second message or an upper limit transmission duration of the second message is associated with a width of the directional beam. The operations of 810 may be performed in accordance with examples as disclosed herein.

Figure 9:
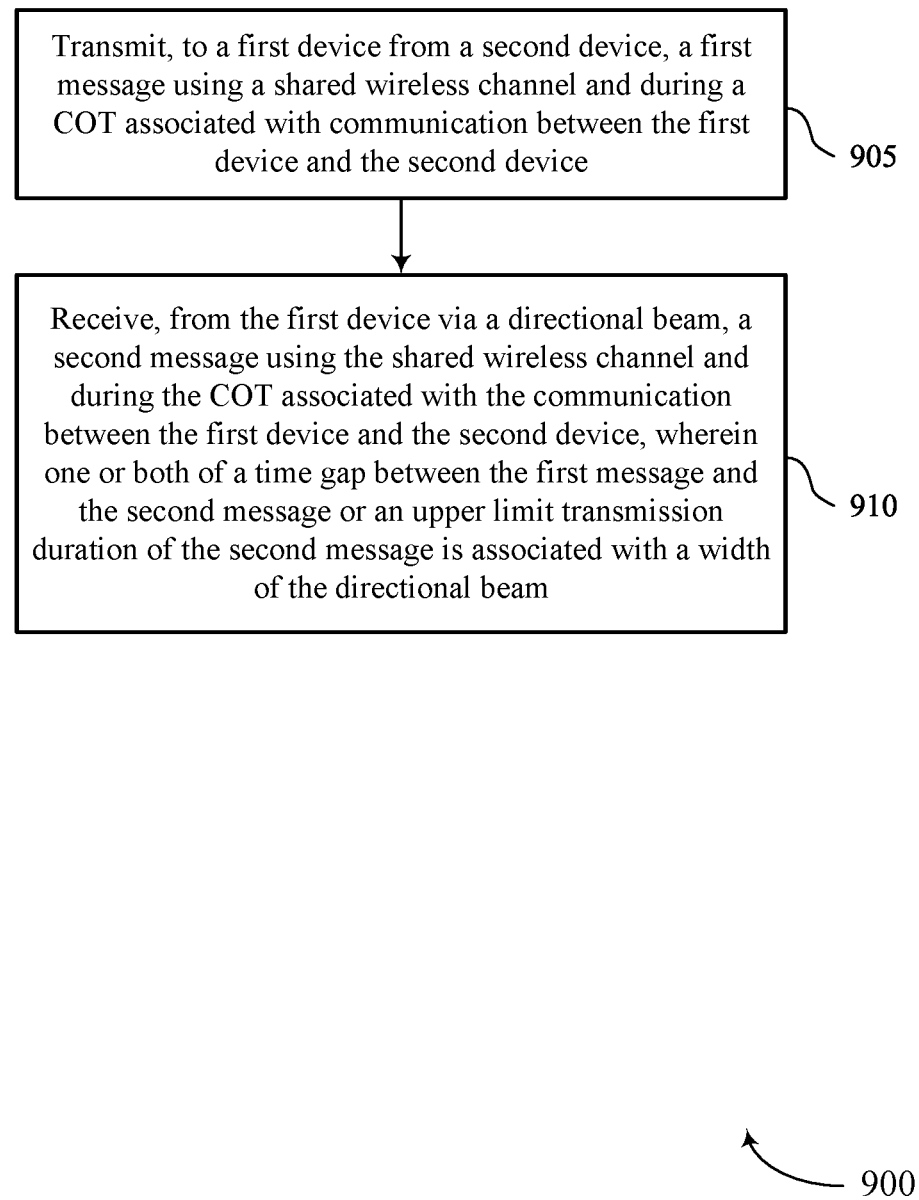

FIG. 9 shows a flowchart illustrating an example method 900 that supports channel occupancy sharing conditions for beam-based channel access. The operations of the method 900 may be implemented by a network entity or its components as described herein. For example, the operations of the method 900 may be performed by a network entity as described with reference to FIGS. 1-5 and 7. In some implementations, a network entity may execute a set of instructions to control the functional elements of the network entity to perform the described functions. Additionally, or alternatively, the network entity may perform aspects of the described functions using special-purpose hardware.

At 905, the method may include transmitting, to a first device from a second device, a first message using a shared wireless channel and during a COT associated with communication between the first device and the second device. The operations of 905 may be performed in accordance with examples as disclosed herein.

At 910, the method may include receiving, from the first device via a directional beam, a second message using the shared wireless channel and during the COT associated with the communication between the first device and the second device, where one or both of a time gap between the first message and the second message or an upper limit transmission duration of the second message is associated with a width of the directional beam. The operations of 910 may be performed in accordance with examples as disclosed herein.

The following provides an overview of some aspects of the present disclosure:

Aspect 1: A method for wireless communication at a first device, including: receiving a first message using a shared wireless channel and during a COT associated with communication between the first device and a second device; and transmitting, via a directional beam, a second message using the shared wireless channel and during the COT associated with the communication between the first device and the second device, where one or both of a time gap between the first message and the second message or an upper limit transmission duration of the second message is associated with a width of the directional beam.

Aspect 2: The method of aspect 1, further including: receiving, from the second device, an indication of one or both of the time gap or the upper limit transmission duration of the second message, where both the time gap and the upper limit transmission duration of the second message are associated with the width of the directional beam.

Aspect 3: The method of any of aspects 1-2, where transmitting the second message includes: setting the time gap to any duration in accordance with the width of the directional beam satisfying a narrow beam condition, where a transmission duration of the second message is unrestricted in accordance with the width of the directional beam satisfying the narrow beam condition.

Aspect 4: The method of any of aspects 1-2, where transmitting the second message includes: setting the time gap to a non-zero duration in accordance with the width of the directional beam satisfying a narrow beam condition, where the non-zero duration is associated with a processing capability of the first device, and where a transmission duration of the second message is unrestricted in accordance with the width of the directional beam satisfying the narrow beam condition.

Aspect 5: The method of any of aspects 1-2, where transmitting the second message includes: setting the time gap to a first duration in accordance with the width of the directional beam failing to satisfy a narrow beam condition.

Aspect 6: The method of aspect 5, where the first duration is any value in accordance with a transmission duration of the second message being less than the upper limit transmission duration.

Aspect 7: The method of aspect 5, where the first duration is a non-zero duration, and a transmission duration of the second message is less than or equal to the upper limit transmission duration in accordance with the width of the directional beam failing to satisfy the narrow beam condition.

Aspect 8: The method of aspect 5, where the first duration is proportional to a transmission duration of the second message, and the transmission duration of the second message is less than or equal to the upper limit transmission duration in accordance with the width of the directional beam failing to satisfy the narrow beam condition.

Aspect 9: The method of aspect 8, further including: receiving, from the second device, an indication of a multiplier value associated with the first duration, where the first duration is equal to a product of the multiplier value and the transmission duration of the second message.

Aspect 10: The method of any of aspects 8-9, where a multiplier value associated with the first duration is stored at the first device, and the first duration is equal to a product of the multiplier value and the transmission duration of the second message.

Aspect 11: The method of any of aspects 1-10, where one or both of the time gap or the upper limit transmission duration of the second message are stored at the first device, and both the time gap and the upper limit transmission duration of the second message are associated with the width of the directional beam.

Aspect 12: The method of any of aspects 1-11, where the width of the directional beam fails to satisfy a narrow beam condition, and the time gap between the first message and the second message or the upper limit transmission duration of the second message, or both, enables the first device to share the COT with the second device without channel sensing.

Aspect 13: A method for wireless communications, including: transmitting, to a first device from a second device, a first message using a shared wireless channel and during a COT associated with communication between the first device and the second device; and receiving, from the first device via a directional beam, a second message using the shared wireless channel and during the COT associated with the communication between the first device and the second device, where one or both of a time gap between the first message and the second message or an upper limit transmission duration of the second message is associated with a width of the directional beam.

Aspect 14: The method of aspect 13, further including: transmitting, to the first device, an indication of one or both of the time gap or the upper limit transmission duration of the second message, where both the time gap and the upper limit transmission duration of the second message are associated with the width of the directional beam.

Aspect 15: The method of any of aspects 13-14, where receiving the second message includes: setting the time gap to any value in accordance with the width of the directional beam satisfying a narrow beam condition, where a transmission duration of the second message is unrestricted in accordance with the width of the directional beam satisfying the narrow beam condition.

Aspect 16: The method of any of aspects 13-14, where receiving the second message includes: setting the time gap to a non-zero duration in accordance with the width of the directional beam satisfying a narrow beam condition, where the non-zero duration is associated with a processing capability of the first device, and where a transmission duration of the second message is unrestricted in accordance with the width of the directional beam satisfying the narrow beam condition.

Aspect 17: The method of any of aspects 13-14, where receiving the second message includes: setting the time gap to a first duration in accordance with the width of the directional beam failing to satisfy a narrow beam condition.

Aspect 18: The method of aspect 17, where the first duration is any value in accordance with a transmission duration of the second message being less than the upper limit transmission duration.

Aspect 19: The method of aspect 17, where the first duration is a non-zero duration, and a transmission duration of the second message is less than or equal to the upper limit transmission duration in accordance with the width of the directional beam failing to satisfy the narrow beam condition.

Aspect 20: The method of aspect 17, where the first duration is proportional to a transmission duration of the second message, and the transmission duration of the second message is less than or equal to the upper limit transmission duration in accordance with the width of the directional beam failing to satisfy the narrow beam condition.

Aspect 21: The method of aspect 20, further including: transmitting, to the first device, an indication of a multiplier value associated with the first duration, where the first duration is equal to a product of the multiplier value and the transmission duration of the second message.

Aspect 22: The method of any of aspects 20-21, where a multiplier value associated with the first duration is stored at the second device, and the first duration is equal to a product of the multiplier value and the transmission duration of the second message.

Aspect 23: The method of any of aspects 13-22, where one or both of the time gap or the upper limit transmission duration of the second message are stored at the second device, and both the time gap and the upper limit transmission duration of the second message are associated with the width of the directional beam.

Aspect 24: The method of any of aspects 13-23, where the width of the directional beam fails to satisfy a narrow beam condition, and the time gap between the first message and the second message or the upper limit transmission duration of the second message, or both, enables the first device to share the COT with the second device without channel sensing.

Aspect 25: An apparatus for wireless communication at a first device, including: one or more interfaces configured to: obtain a first message using a shared wireless channel and during a COT associated with communication between the first device and a second device; and output, via a directional beam, a second message using the shared wireless channel and during the COT associated with the communication between the first device and the second device, where one or both of a time gap between the first message and the second message or an upper limit transmission duration of the second message is associated with a width of the directional beam.

Aspect 26: The apparatus of aspect 25, where the one or more interfaces are further configured to: obtain, from the second device, an indication of one or both of the time gap or the upper limit transmission duration of the second message, where both the time gap and the upper limit transmission duration of the second message are associated with the width of the directional beam.

Aspect 27: The apparatus of any of aspects 25-26, where, to output the second message, a processing system is configured to: set the time gap to any duration in accordance with the width of the directional beam satisfying a narrow beam condition, where a transmission duration of the second message is unrestricted in accordance with the width of the directional beam satisfying the narrow beam condition.

Aspect 28: The apparatus of any of aspects 25-26, where, to output the second message, a processing system is configured to: set the time gap to a non-zero duration in accordance with the width of the directional beam satisfying a narrow beam condition, where the non-zero duration is associated with a processing capability of the first device, and where a transmission duration of the second message is unrestricted in accordance with the width of the directional beam satisfying the narrow beam condition.

Aspect 29: The apparatus of any of aspects 25-26, where, to output the second message, a processing system is configured to: set the time gap to a first duration in accordance with the width of the directional beam failing to satisfy a narrow beam condition.

Aspect 30: The apparatus of aspect 29, where the first duration is any value in accordance with a transmission duration of the second message being less than the upper limit transmission duration.

Aspect 31: The apparatus of aspect 29, where the first duration is a non-zero duration, and a transmission duration of the second message is less than or equal to the upper limit transmission duration in accordance with the width of the directional beam failing to satisfy the narrow beam condition.

Aspect 32: The apparatus of aspect 29, where the first duration is proportional to a transmission duration of the second message, and the transmission duration of the second message is less than or equal to the upper limit transmission duration in accordance with the width of the directional beam failing to satisfy the narrow beam condition.

Aspect 33: The apparatus of aspect 32, where the one or more interfaces are further configured to: obtain, from the second device, an indication of a multiplier value associated with the first duration, where the first duration is equal to a product of the multiplier value and the transmission duration of the second message.

Aspect 34: The apparatus of any of aspects 32-33, where a multiplier value associated with the first duration is stored at the first device, and the first duration is equal to a product of the multiplier value and the transmission duration of the second message.

Aspect 35: The apparatus of any of aspects 25-34, where one or both of the time gap or the upper limit transmission duration of the second message are stored at the first device, and both the time gap and the upper limit transmission duration of the second message are associated with the width of the directional beam.

Aspect 36: The apparatus of any of aspects 25-35, where the width of the directional beam fails to satisfy a narrow beam condition, and the time gap between the first message and the second message or the upper limit transmission duration of the second message, or both, enables the first device to share the COT with the second device without channel sensing.

Aspect 37: An apparatus for wireless communications, including: one or more interfaces configured to: output, to a first device from a second device, a first message using a shared wireless channel and during a COT associated with communication between the first device and the second device; and obtain, from the first device via a directional beam, a second message using the shared wireless channel and during the COT associated with the communication between the first device and the second device, where one or both of a time gap between the first message and the second message or an upper limit transmission duration of the second message is associated with a width of the directional beam.

Aspect 38: The apparatus of aspect 37, where the one or more interfaces are further configured to: output, to the first device, an indication of one or both of the time gap or the upper limit transmission duration of the second message, where both the time gap and the upper limit transmission duration of the second message are associated with the width of the directional beam.

Aspect 39: The apparatus of any of aspects 37-38, where, to obtain the second message, a processing system is configured to: set the time gap to any value in accordance with the width of the directional beam satisfying a narrow beam condition, where a transmission duration of the second message is unrestricted in accordance with the width of the directional beam satisfying the narrow beam condition.

Aspect 40: The apparatus of any of aspects 37-38, where, to obtain the second message, a processing system is configured to: set the time gap to a non-zero duration in accordance with the width of the directional beam satisfying a narrow beam condition, where the non-zero duration is associated with a processing capability of the first device, and where a transmission duration of the second message is unrestricted in accordance with the width of the directional beam satisfying the narrow beam condition.

Aspect 41: The apparatus of any of aspects 37-38, where, to obtain the second message, a processing system is configured to: set the time gap to a first duration in accordance with the width of the directional beam failing to satisfy a narrow beam condition.

Aspect 42: The apparatus of aspect 41, where the first duration is any value in accordance with a transmission duration of the second message being less than the upper limit transmission duration.

Aspect 43: The apparatus of aspect 41, where the first duration is a non-zero duration, and a transmission duration of the second message is less than or equal to the upper limit transmission duration in accordance with the width of the directional beam failing to satisfy the narrow beam condition.

Aspect 44: The apparatus of aspect 41, where the first duration is proportional to a transmission duration of the second message, and the transmission duration of the second message is less than or equal to the upper limit transmission duration in accordance with the width of the directional beam failing to satisfy the narrow beam condition.

Aspect 45: The apparatus of aspect 44, where the one or more interfaces are further configured to: output, to the first device, an indication of a multiplier value associated with the first duration, where the first duration is equal to a product of the multiplier value and the transmission duration of the second message.

Aspect 46: The apparatus of any of aspects 44-45, where a multiplier value associated with the first duration is stored at the second device, and the first duration is equal to a product of the multiplier value and the transmission duration of the second message.

Aspect 47: The apparatus of any of aspects 37-46, where one or both of the time gap or the upper limit transmission duration of the second message are stored at the second device, and both the time gap and the upper limit transmission duration of the second message are associated with the width of the directional beam.

Aspect 48: The apparatus of any of aspects 37-47, where the width of the directional beam fails to satisfy a narrow beam condition, and the time gap between the first message and the second message or the upper limit transmission duration of the second message, or both, enables the first device to share the COT with the second device without channel sensing.

Aspect 49: An apparatus for wireless communication at a first device, including: means for receiving a first message using a shared wireless channel and during a COT associated with communication between the first device and a second device; and means for transmitting, via a directional beam, a second message using the shared wireless channel and during the COT associated with the communication between the first device and the second device, where one or both of a time gap between the first message and the second message or an upper limit transmission duration of the second message is associated with a width of the directional beam.

Aspect 50: The apparatus of aspect 49, further including: means for receiving, from the second device, an indication of one or both of the time gap or the upper limit transmission duration of the second message, where both the time gap and the upper limit transmission duration of the second message are associated with the width of the directional beam.

Aspect 51: The apparatus of any of aspects 49-50, where the means for transmitting the second message include: means for setting the time gap to any duration in accordance with the width of the directional beam satisfying a narrow beam condition, where a transmission duration of the second message is unrestricted in accordance with the width of the directional beam satisfying the narrow beam condition.

Aspect 52: The apparatus of any of aspects 49-50, where the means for transmitting the second message include: means for setting the time gap to a non-zero duration in accordance with the width of the directional beam satisfying a narrow beam condition, where the non-zero duration is associated with a processing capability of the first device, and where a transmission duration of the second message is unrestricted in accordance with the width of the directional beam satisfying the narrow beam condition.

Aspect 53: The apparatus of any of aspects 49-50, where the means for transmitting the second message include: means for setting the time gap to a first duration in accordance with the width of the directional beam failing to satisfy a narrow beam condition.

Aspect 54: The apparatus of aspect 53, where the first duration is any value in accordance with a transmission duration of the second message being less than the upper limit transmission duration.

Aspect 55: The apparatus of aspect 53, where the first duration is a non-zero duration, and a transmission duration of the second message is less than or equal to the upper limit transmission duration in accordance with the width of the directional beam failing to satisfy the narrow beam condition.

Aspect 56: The apparatus of aspect 53, where the first duration is proportional to a transmission duration of the second message, and the transmission duration of the second message is less than or equal to the upper limit transmission duration in accordance with the width of the directional beam failing to satisfy the narrow beam condition.

Aspect 57: The apparatus of aspect 56, further including: means for receiving, from the second device, an indication of a multiplier value associated with the first duration, where the first duration is equal to a product of the multiplier value and the transmission duration of the second message.

Aspect 58: The apparatus of any of aspects 56-57, where a multiplier value associated with the first duration is stored at the first device, and the first duration is equal to a product of the multiplier value and the transmission duration of the second message.

Aspect 59: The apparatus of any of aspects 49-58, where one or both of the time gap or the upper limit transmission duration of the second message are stored at the first device, and both the time gap and the upper limit transmission duration of the second message are associated with the width of the directional beam.

Aspect 60: The apparatus of any of aspects 49-59, where the width of the directional beam fails to satisfy a narrow beam condition, and the time gap between the first message and the second message or the upper limit transmission duration of the second message, or both, enables the first device to share the COT with the second device without channel sensing.

Aspect 61: An apparatus for wireless communications, including: means for transmitting, to a first device from a second device, a first message using a shared wireless channel and during a COT associated with communication between the first device and the second device; and means for receiving, from the first device via a directional beam, a second message using the shared wireless channel and during the COT associated with the communication between the first device and the second device, where one or both of a time gap between the first message and the second message or an upper limit transmission duration of the second message is associated with a width of the directional beam.

Aspect 62: The apparatus of aspect 61, further including: means for transmitting, to the first device, an indication of one or both of the time gap or the upper limit transmission duration of the second message, where both the time gap and the upper limit transmission duration of the second message are associated with the width of the directional beam.

Aspect 63: The apparatus of any of aspects 61-62, where the means for receiving the second message include: means for setting the time gap to any value in accordance with the width of the directional beam satisfying a narrow beam condition, where a transmission duration of the second message is unrestricted in accordance with the width of the directional beam satisfying the narrow beam condition.

Aspect 64: The apparatus of any of aspects 61-62, where the means for receiving the second message include: means for setting the time gap to a non-zero duration in accordance with the width of the directional beam satisfying a narrow beam condition, where the non-zero duration is associated with a processing capability of the first device, and where a transmission duration of the second message is unrestricted in accordance with the width of the directional beam satisfying the narrow beam condition.

Aspect 65: The apparatus of any of aspects 61-62, where the means for receiving the second message include: means for setting the time gap to a first duration in accordance with the width of the directional beam failing to satisfy a narrow beam condition.

Aspect 66: The apparatus of aspect 65, where the first duration is any value in accordance with a transmission duration of the second message being less than the upper limit transmission duration.

Aspect 67: The apparatus of aspect 65, where the first duration is a non-zero duration, and a transmission duration of the second message is less than or equal to the upper limit transmission duration in accordance with the width of the directional beam failing to satisfy the narrow beam condition.

Aspect 68: The apparatus of aspect 65, where the first duration is proportional to a transmission duration of the second message, and the transmission duration of the second message is less than or equal to the upper limit transmission duration in accordance with the width of the directional beam failing to satisfy the narrow beam condition.

Aspect 69: The apparatus of aspect 68, further including: means for transmitting, to the first device, an indication of a multiplier value associated with the first duration, where the first duration is equal to a product of the multiplier value and the transmission duration of the second message.

Aspect 70: The apparatus of any of aspects 68-69, where a multiplier value associated with the first duration is stored at the second device, and the first duration is equal to a product of the multiplier value and the transmission duration of the second message.

Aspect 71: The apparatus of any of aspects 61-70, where one or both of the time gap or the upper limit transmission duration of the second message are stored at the second device, and both the time gap and the upper limit transmission duration of the second message are associated with the width of the directional beam.

Aspect 72: The apparatus of any of aspects 61-71, where the width of the directional beam fails to satisfy a narrow beam condition, and the time gap between the first message and the second message or the upper limit transmission duration of the second message, or both, enables the first device to share the COT with the second device without channel sensing.

Aspect 73: A non-transitory computer-readable medium storing code for wireless communication at a first device, the code including instructions executable by a processor to: receive a first message using a shared wireless channel and during a COT associated with communication between the first device and a second device; and transmit, via a directional beam, a second message using the shared wireless channel and during the COT associated with the communication between the first device and the second device, where one or both of a time gap between the first message and the second message or an upper limit transmission duration of the second message is associated with a width of the directional beam.

Aspect 74: The non-transitory computer-readable medium of aspect 73, where the instructions are further executable by the processor to: receive, from the second device, an indication of one or both of the time gap or the upper limit transmission duration of the second message, where both the time gap and the upper limit transmission duration of the second message are associated with the width of the directional beam.

Aspect 75: The non-transitory computer-readable medium of any of aspects 73-74, where the instructions to transmit the second message are executable by the processor to: set the time gap to any duration in accordance with the width of the directional beam satisfying a narrow beam condition, where a transmission duration of the second message is unrestricted in accordance with the width of the directional beam satisfying the narrow beam condition.

Aspect 76: The non-transitory computer-readable medium of any of aspects 73-74, where the instructions to transmit the second message are executable by the processor to: set the time gap to a non-zero duration in accordance with the width of the directional beam satisfying a narrow beam condition, where the non-zero duration is associated with a processing capability of the first device, and where a transmission duration of the second message is unrestricted in accordance with the width of the directional beam satisfying the narrow beam condition.

Aspect 77: The non-transitory computer-readable medium of any of aspects 73-74, where the instructions to transmit the second message are executable by the processor to: set the time gap to a first duration in accordance with the width of the directional beam failing to satisfy a narrow beam condition.

Aspect 78: The non-transitory computer-readable medium of aspect 77, where the first duration is any value in accordance with a transmission duration of the second message being less than the upper limit transmission duration.

Aspect 79: The non-transitory computer-readable medium of aspect 77, where the first duration is a non-zero duration, and a transmission duration of the second message is less than or equal to the upper limit transmission duration in accordance with the width of the directional beam failing to satisfy the narrow beam condition.

Aspect 80: The non-transitory computer-readable medium of aspect 77, where the first duration is proportional to a transmission duration of the second message, and the transmission duration of the second message is less than or equal to the upper limit transmission duration in accordance with the width of the directional beam failing to satisfy the narrow beam condition.

Aspect 81: The non-transitory computer-readable medium of aspect 80, where the instructions are further executable by the processor to: receive, from the second device, an indication of a multiplier value associated with the first duration, where the first duration is equal to a product of the multiplier value and the transmission duration of the second message.

Aspect 82: The non-transitory computer-readable medium of any of aspects 80-81, where a multiplier value associated with the first duration is stored at the first device, and the first duration is equal to a product of the multiplier value and the transmission duration of the second message.

Aspect 83: The non-transitory computer-readable medium of any of aspects 73-82, where one or both of the time gap or the upper limit transmission duration of the second message are stored at the first device, and both the time gap and the upper limit transmission duration of the second message are associated with the width of the directional beam.

Aspect 84: The non-transitory computer-readable medium of any of aspects 73-83, where the width of the directional beam fails to satisfy a narrow beam condition, and the time gap between the first message and the second message or the upper limit transmission duration of the second message, or both, enables the first device to share the COT with the second device without channel sensing.

Aspect 85: A non-transitory computer-readable medium storing code for wireless communications, the code including instructions executable by a processor to: transmit, to a first device from a second device, a first message using a shared wireless channel and during a COT associated with communication between the first device and the second device; and receive, from the first device via a directional beam, a second message using the shared wireless channel and during the COT associated with the communication between the first device and the second device, where one or both of a time gap between the first message and the second message or an upper limit transmission duration of the second message is associated with a width of the directional beam.

Aspect 86: The non-transitory computer-readable medium of aspect 85, where the instructions are further executable by the processor to: transmit, to the first device, an indication of one or both of the time gap or the upper limit transmission duration of the second message, where both the time gap and the upper limit transmission duration of the second message are associated with the width of the directional beam.

Aspect 87: The non-transitory computer-readable medium of any of aspects 85-86, where the instructions to receive the second message are executable by the processor to: set the time gap to any value in accordance with the width of the directional beam satisfying a narrow beam condition, where a transmission duration of the second message is unrestricted in accordance with the width of the directional beam satisfying the narrow beam condition.

Aspect 88: The non-transitory computer-readable medium of any of aspects 85-86, where the instructions to receive the second message are executable by the processor to: set the time gap to a non-zero duration in accordance with the width of the directional beam satisfying a narrow beam condition, where the non-zero duration is associated with a processing capability of the first device, and where a transmission duration of the second message is unrestricted in accordance with the width of the directional beam satisfying the narrow beam condition.

Aspect 89: The non-transitory computer-readable medium of any of aspects 85-86, where the instructions to receive the second message are executable by the processor to: set the time gap to a first duration in accordance with the width of the directional beam failing to satisfy a narrow beam condition.

Aspect 90: The non-transitory computer-readable medium of aspect 89, where the first duration is any value in accordance with a transmission duration of the second message being less than the upper limit transmission duration.

Aspect 91: The non-transitory computer-readable medium of aspect 89, where the first duration is a non-zero duration, and a transmission duration of the second message is less than or equal to the upper limit transmission duration in accordance with the width of the directional beam failing to satisfy the narrow beam condition.

Aspect 92: The non-transitory computer-readable medium of aspect 89, where the first duration is proportional to a transmission duration of the second message, and the transmission duration of the second message is less than or equal to the upper limit transmission duration in accordance with the width of the directional beam failing to satisfy the narrow beam condition.

Aspect 93: The non-transitory computer-readable medium of aspect 92, where the instructions are further executable by the processor to: transmit, to the first device, an indication of a multiplier value associated with the first duration, where the first duration is equal to a product of the multiplier value and the transmission duration of the second message.

Aspect 94: The non-transitory computer-readable medium of any of aspects 92-93, where a multiplier value associated with the first duration is stored at the second device, and the first duration is equal to a product of the multiplier value and the transmission duration of the second message.

Aspect 95: The non-transitory computer-readable medium of any of aspects 85-94, where one or both of the time gap or the upper limit transmission duration of the second message are stored at the second device, and both the time gap and the upper limit transmission duration of the second message are associated with the width of the directional beam.

Aspect 96: The non-transitory computer-readable medium of any of aspects 85-95, where the width of the directional beam fails to satisfy a narrow beam condition, and the time gap between the first message and the second message or the upper limit transmission duration of the second message, or both, enables the first device to share the COT with the second device without channel sensing.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A first device for wireless communication, comprising:
at least one processor; and
at least one memory coupled with the at least one processor, the at least one memory storing instructions executable by the at least one processor to cause the first device to:
obtain a first downlink message using a shared wireless channel and during a channel occupancy time (COT) associated with communication between the first device and a second device; and
output, via a directional beam, a second uplink message using the shared wireless channel and during the COT associated with the communication between the first device and the second device, wherein one or both of a time gap between the first downlink message and the second uplink message or an upper limit transmission duration of the second uplink message is associated with a width of the directional beam, wherein, to output the second uplink message, the instructions are executable by the at least one processor to cause the first device to:
set the time gap to a first duration in accordance with the width of the directional beam failing to satisfy a narrow beam condition, wherein the first duration is proportional to a transmission duration of the second uplink message, and wherein the transmission duration of the second uplink message is less than or equal to the upper limit transmission duration in accordance with the width of the directional beam failing to satisfy the narrow beam condition.

2. The first device of claim 1, wherein the instructions are further executable by the at least one processor to cause the first device to:
obtain, from the second device, an indication of one or both of the time gap or the upper limit transmission duration of the second uplink message, wherein both the time gap and the upper limit transmission duration of the second uplink message are associated with the width of the directional beam.

3. The first device of claim 1, wherein the first duration is a non-zero duration.

4. The first device of claim 1, wherein the instructions are further executable by the at least one processor to cause the first device to:

obtain, from the second device, an indication of a multiplier value associated with the first duration, wherein the first duration is equal to a product of the multiplier value and the transmission duration of the second uplink message.

5. The first device of claim 1, wherein a multiplier value associated with the first duration is stored at the first device, and wherein the first duration is equal to a product of the multiplier value and the transmission duration of the second uplink message.

6. The first device of claim 1, wherein one or both of the time gap or the upper limit transmission duration of the second uplink message are stored at the first device, and wherein both the time gap and the upper limit transmission duration of the second uplink message are associated with the width of the directional beam.

7. The first device of claim 1, wherein the width of the directional beam fails to satisfy a narrow beam condition, and wherein the time gap between the first downlink message and the second uplink message or the upper limit transmission duration of the second uplink message, or both, enables the first device to share the COT with the second device without channel sensing.

8. A second device for wireless communications, comprising:
at least one processor; and
at least one memory coupled with the at least one processor, the at least one memory storing instructions executable by the at least one processor to cause the second device to:
output, to a first device from the second device, a first downlink message using a shared wireless channel and during a channel occupancy time (COT) associated with communication between the first device and the second device; and
obtain, from the first device via a directional beam, a second uplink message using the shared wireless channel and during the COT associated with the communication between the first device and the second device, wherein one or both of a time gap between the first downlink message and the second uplink message or an upper limit transmission duration of the second uplink message is associated with a width of the directional beam, wherein, to obtain the second uplink message, the instructions are executable by the at least one processor to cause the second device to:
set the time gap to a first duration in accordance with the width of the directional beam failing to satisfy a narrow beam condition, wherein the first duration is proportional to a transmission duration of the second uplink message, and wherein the transmission duration of the second uplink message is less than or equal to the upper limit transmission duration in accordance with the width of the directional beam failing to satisfy the narrow beam condition.

9. The second device of claim 8, wherein the instructions are further executable by the at least one processor to cause the second device to:
output, to the first device, an indication of one or both of the time gap or the upper limit transmission duration of the second uplink message, wherein both the time gap and the upper limit transmission duration of the second uplink message are associated with the width of the directional beam.

10. The second device of claim 8, wherein the first duration is a non-zero duration.

11. A method for wireless communication at a first device, comprising:
receiving a first downlink message using a shared wireless channel and during a channel occupancy time (COT) associated with communication between the first device and a second device; and
transmitting, via a directional beam, a second uplink message using the shared wireless channel and during the COT associated with the communication between the first device and the second device, wherein one or both of a time gap between the first downlink message and the second uplink message or an upper limit transmission duration of the second uplink message is associated with a width of the directional beam, wherein transmitting the second uplink message comprises:
setting the time gap to a first duration in accordance with the width of the directional beam failing to satisfy a narrow beam condition, wherein the first duration is proportional to a transmission duration of the second uplink message, and wherein the transmission duration of the second uplink message is less than or equal to the upper limit transmission duration in accordance with the width of the directional beam failing to satisfy the narrow beam condition.

12. The method of claim 11, further comprising:
receiving, from the second device, an indication of one or both of the time gap or the upper limit transmission duration of the second uplink message, wherein both the time gap and the upper limit transmission duration of the second uplink message are associated with the width of the directional beam.

13. The method of claim 11, wherein the first duration is a non-zero duration.

14. A method for wireless communications, comprising:
transmitting, to a first device from a second device, a first downlink message using a shared wireless channel and during a channel occupancy time (COT) associated with communication between the first device and the second device; and
receiving, from the first device via a directional beam, a second uplink message using the shared wireless channel and during the COT associated with the communication between the first device and the second device, wherein one or both of a time gap between the first downlink message and the second uplink message or an upper limit transmission duration of the second uplink message is associated with a width of the directional beam, wherein receiving the second uplink message comprises:
setting the time gap to a first duration in accordance with the width of the directional beam failing to satisfy a narrow beam condition, wherein the first duration is proportional to a transmission duration of the second uplink message, and wherein the transmission duration of the second uplink message is less than or equal to the upper limit transmission duration in accordance with the width of the directional beam failing to satisfy the narrow beam condition.

15. The method of claim 14, further comprising:
transmitting, to the first device, an indication of one or both of the time gap or the upper limit transmission duration of the second uplink message, wherein both the time gap and the upper limit transmission duration of the second uplink message are associated with the width of the directional beam.

16. The method of claim 14, wherein the first duration is a non-zero duration.

* * * * *